United States Patent
Hayashi et al.

(10) Patent No.: US 7,898,625 B2
(45) Date of Patent: Mar. 1, 2011

(54) LIQUID CRYSTAL DEVICE HAVING A PAIR OF ELECTRODES WITH A VERTICAL ALIGNMENT FILM IN WHICH THE CHIRAL PITCH LENGTH TO GAP RATIO (P/G) IS 0.06 TO LESS THAN 1.0

(75) Inventors: Naoyuki Hayashi, Kanagawa (JP); Takashi Kato, Kanagawa (JP); Koji Takaku, Kanagawa (JP); Katsuyuki Yofu, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 369 days.

(21) Appl. No.: 12/199,997

(22) Filed: Aug. 28, 2008

(65) Prior Publication Data
US 2010/0039595 A1    Feb. 18, 2010

(30) Foreign Application Priority Data

Sep. 18, 2007   (JP)   ............... 2007-241470
May 9, 2008    (JP)   ............... 2008-124043

(51) Int. Cl.
G02F 1/1337    (2006.01)
(52) U.S. Cl. ............... 349/130; 349/79; 349/115; 349/164; 313/112; 313/509
(58) Field of Classification Search ............... 349/115, 349/130, 163, 164; 313/112, 509
See application file for complete search history.

(56) References Cited

U.S. PATENT DOCUMENTS

| 5,529,818 A * | 6/1996 | Tsuda et al. ............... 428/1.2 |
| 6,924,873 B2 | 8/2005 | Asada et al. |
| 7,576,478 B2 * | 8/2009 | Hikmet ............... 313/110 |

FOREIGN PATENT DOCUMENTS

| JP | 7-104297 A | 4/1995 |
| JP | 7-199233 A | 8/1995 |
| WO | WO-02/093241 A1 | 11/2002 |

OTHER PUBLICATIONS

Ichimura, Kunihiro Ed., Development of Chromic Materials, CMC Publishing Co., Ltd. (issued in 2000), pp. 226 to 236.

* cited by examiner

*Primary Examiner*—John Heyman
(74) *Attorney, Agent, or Firm*—Birch, Stewart, Kolasch & Birch, LLP

(57) ABSTRACT

A liquid crystal device including a pair of electrodes provided with a vertical alignment film and a liquid crystal layer disposed between the pair of electrodes and including a liquid crystal composition containing a liquid crystal with positive dielectric anisotropy, a dichroic dye and a chiral reagent, with a ratio (P/G) of a chiral pitch length (P) of the liquid crystal composition to a gap (G) between the pair of electrodes being from 0.06 to less than 1.0.

10 Claims, 8 Drawing Sheets

LIQUID CRYSTAL DEVICE HAVING A PAIR OF ELECTRODES WITH A VERTICAL ALIGNMENT FILM IN WHICH THE CHIRAL PITCH LENGTH TO GAP RATIO (P/G) IS 0.06 TO LESS THAN 1.0

CROSS REFERENCE TO RELATED APPLICATIONS

This application claims priority under 35USC 119 from Japanese Patent Application Nos. 2007-241470 and 2008-124043, the disclosure of which is incorporated herein by reference.

BACKGROUND OF THE INVENTION

1. Field of the Invention

The present invention relates to a liquid crystal device.

2. Description of the Related Art

As a method for achieving switching between a colored state and a transparent state, a display device of guest-host mode is known. This display device of guest-host mode is able to achieve bright display and is expected as a display device suitable for a reflection type.

As disclosed in Japanese Patent Application Laid-Open (JP-A) Nos. 7-104297 and 7-199233, in a display device of guest-host mode, in order to render it in a colored state at the OFF time of voltage (at the initial time) (i.e. initial coloring mode), a liquid crystal with positive dielectric anisotropy ($\Delta\in$) is combined with a horizontal alignment film. At the time when no voltage is applied, a host liquid crystal is horizontally aligned against electrodes due to the horizontal alignment film, and following the alignment of the liquid crystal, a dichroic dye is also horizontally aligned to exhibit a color. When voltage is applied, the host liquid crystal with positive dielectric anisotropy ($\Delta\in$) is vertically aligned against the electrodes, whereby the light transmittance increases.

On the other hand, for the purposes of use in, for example, light modulation of a windowpane, security, interiors, advertisements and information indication panels, there are uses of a liquid crystal for limiting the transmission of light or shielding light. For such an application, it is desirable to perform display of a scattered (light shielded) state at the OFF time of voltage (at the initial time) and achieve switching between a scattered (light shielded) state and a transparent state by electric field driving.

In a driving method of a liquid crystal device, the following methods are disclosed as the method for achieving switching between a scattered (light shielded) state and a transparent state.

For example, there is a method for using a liquid crystal device provided with a liquid crystal layer in which a capsule including a liquid crystal therein is dispersed in a polymer. At the OFF time of voltage (at the initial time), the alignment of the liquid crystal becomes random, and light is diffusely reflected due to a difference in refractive index between the liquid crystal and the polymer to cause scattering (light shielding). At the ON time of voltage (at the time of voltage application), the alignment of the liquid crystal becomes uniform, and the major axis direction of the liquid crystal and the refractive index of the polymer are substantially coincident with each other, thereby producing a transparent state. In this way, the white scattered state and the transparent state are switched by the ON/OFF operation of voltage (see, for example, ICHIMURA, Kunihiro Ed., *Development of Chromic Materials*, CMC Publishing Co., Ltd. (issued in 2000), pages 226 to 236).

But, in this polymer-containing liquid crystal device, in order to display the colored state, it is necessary to dissolve a dichroic dye in the liquid crystal. However, the dichroic dye is dyed on a capsule film, or the dichroic dye is easily aligned along the polymer film to reduce voltage responsibility, thereby causing a problem that the transmittance at the transparent time is reduced.

As other methods, as disclosed in WO 2002/093241, there is a method for using a liquid crystal device provided with a liquid crystal layer prepared by mixing an uncured ultraviolet ray-curable resin, a polymerization initiator, a liquid crystal and a dichroic dye, and curing the resin upon irradiation with ultraviolet rays. This method is a method in which this liquid crystal device acts on the same principle as in the above-described liquid crystal device because the polymer and the liquid crystal cause phase separation to form an interface between the polymer and the liquid crystal.

However, according to this method, there is involved a problem that the dye is decomposed upon irradiation with ultraviolet rays or due to the polymerization initiator, thereby reducing coloring properties.

In these display methods employing an initial scattering and coloring system using a polymer, in order to increase absorbance scattering and coloring for the purpose of realizing high contrast, when widening of a cell gap may be considered. However, when the cell gap is widened, transmittance at the time of transparent display is reduced and, as a result, the contrast tends not to increase sufficiently. Also, when the cell gap is wide, there is a problem of the driving voltage increasing due to application of the polymer.

SUMMARY OF THE INVENTION

A first aspect of the present invention is concerned with a liquid crystal device including: a pair of electrodes provided with a vertical alignment film; and a liquid crystal layer disposed between the pair of electrodes and including a liquid crystal composition containing a liquid crystal with positive dielectric anisotropy, a dichroic dye and a chiral reagent; wherein a ratio (P/G) of a chiral pitch length (P) of the liquid crystal composition to a gap (G) between the pair of electrodes is from 0.06 to less than 1.0.

BRIEF DESCRIPTION OF THE DRAWINGS

FIG. 1 is a schematic view explaining the behavior of alignment of a liquid crystal of the present invention, in which

FIG. 3 is a schematic view explaining the behavior of alignment of a related-art liquid crystal, in which

DETAILED DESCRIPTION OF THE INVENTION

Figure 1A:
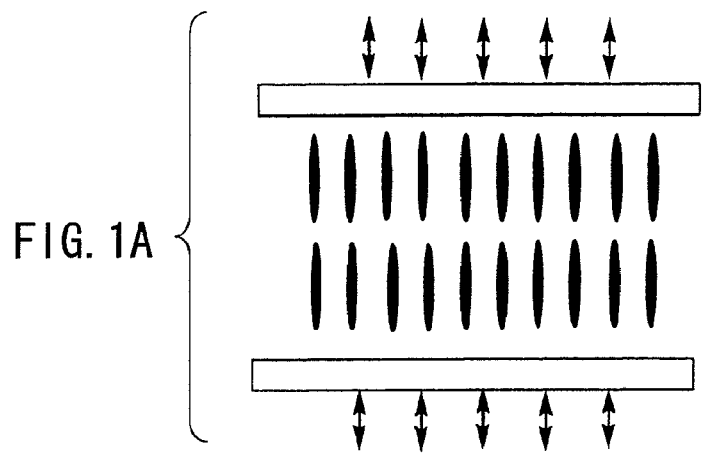
FIG. 1A shows alignment of the liquid crystal when voltage is applied.

For preventing dyeing of a dichroic dye and a reducing voltage responsibility, the present inventors made investigations regarding a display method for achieving switching between an initial colored and scattered (light shielded) state and a transparent state in a liquid crystal device not using a polymer.

As a result of further extensive and intensive investigations, the present inventors obtained knowledge that the above-described problems can be solved by combining a vertical alignment film with a liquid crystal with positive dielectric anisotropy ($\Delta \in$). As a result of even further investigations on the basis of this knowledge, they have accomplished the present invention.

The liquid crystal device of the present invention includes a pair of electrodes provided with a vertical alignment film and a liquid crystal layer including a liquid crystal composition containing a liquid crystal with positive dielectric anisotropy, a dichroic dye and a chiral reagent between the pair of electrodes. Here, in the present invention, it is necessary that a chiral pitch length (P) of the liquid crystal composition and a gap (G) between the pair of electrodes are satisfied with the relationship of the following Expression (1).

0.06≦{Chiral pitch length (*P*) of liquid crystal composition}/{Gap (*G*) between the pair of electrodes}<1.0   Expression (1):

According to the present invention, it is possible to provide a liquid crystal device capable of achieving switching between an initial colored and scattered (light shielded) state and a transparent state, in which the driving voltage is low, the transparency in a transparent state is high, and the colored and scattered state can be kept without voltage application.

The alignment state of each of the related-art liquid crystal and the liquid crystal of the present invention are hereunder described with reference to the accompanying drawings. FIGS. 1A to 1C and FIG. 2 explain the behavior of the liquid crystal of the present invention; and FIGS. 3A to 3C and FIG. 4 explain the behavior of the related-art liquid crystal.

First of all, a related-art display method for achieving switching between a colored and scattered (light shielded) state and a transparent state is explained with reference to FIGS. 3A to 3C.

In general, in order to achieve switching of displaying in a liquid crystal device, a liquid crystal with positive dielectric anisotropy ($\Delta \in$) and a horizontal alignment film are combined, or a liquid crystal with negative dielectric anisotropy ($\Delta \in$) and a vertical alignment film are combined. However, in order to render it in a colored state at the OFF time of voltage (at the initial time) (i.e. initial coloring mode), a liquid crystal with positive dielectric anisotropy ($\Delta \in$) is combined with a horizontal alignment film. Accordingly, in the liquid crystal device of FIGS. 3A to 3C, a liquid crystal with positive dielectric anisotropy ($\Delta \in$) is used for an electrode provided with a horizontal alignment film.

Figure 3A:
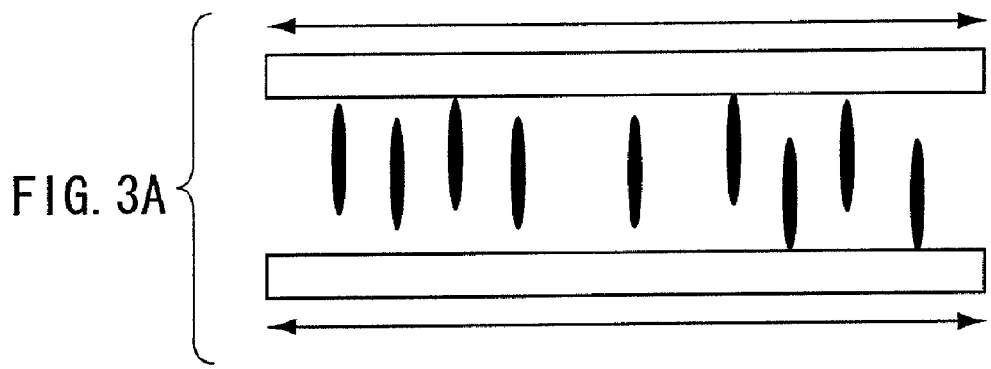
FIG. 3A shows alignment of the liquid crystal when voltage is applied.

FIG. 3A is a schematic view showing alignment of a liquid crystal when voltage is applied; FIG. 3B is a schematic view showing alignment of a liquid crystal immediately after stopping the application of voltage; and FIG. 3C is a schematic view showing alignment of a liquid crystal when a sufficient time has elapsed after stopping the application of voltage.

As shown in FIG. 3A, when voltage is applied, a liquid crystal with positive dielectric anisotropy is vertically aligned against an electrode. In a liquid crystal composition containing a dichroic dye together with this liquid crystal, the dichroic dye is also vertically aligned against the electrode in conformity with the alignment of the liquid crystal, light transmits therethrough, and a transparent state is produced.

Figure 3B:
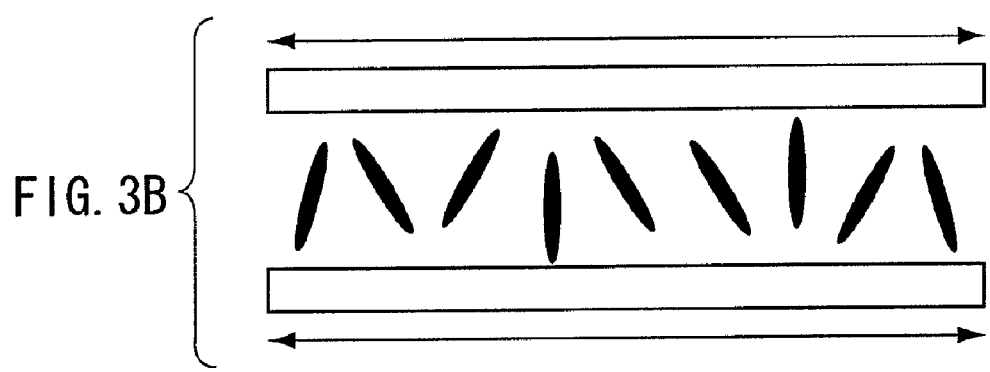
FIG. 3B shows alignment of the liquid crystal immediately after stopping the application of voltage.

When the application of voltage is stopped, as shown in FIG. 3B, the alignment of the liquid crystal is disturbed, and a colored and scattered state is produced due to partial light absorption of the dichroic dye and the influence of the refractive index anisotropy ($\Delta n$) of the liquid crystal.

Figure 3C:
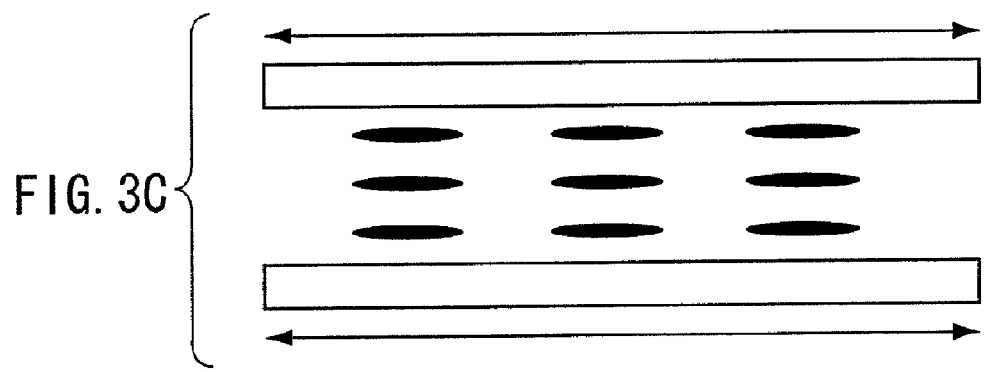
FIG. 3C shows alignment of the liquid crystal when a sufficient time has elapsed after stopping the application of voltage.

However, in the liquid crystal device shown in FIGS. 3A to 3C, since the horizontal alignment film is provided, as shown in FIG. 3C, the alignment of the liquid crystal becomes horizontal uniformly with a lapse of time, and as a result, a colored (transparent) state is produced. While the time required for reaching a horizontal alignment state as shown in FIG. 3C varies depending upon the viscosity of the liquid crystal, the change can occur in an instant in the swiftest cases.

Accordingly, in the related-art display method for achieving switching between a colored and scattered (light shielded) state and a transparent state, it is difficult to maintain the colored and scattered state as shown in FIG. 3B.

In the colored state of the liquid crystal device as shown in FIGS. 3A to 3C, in order to reveal high absorbance, it is desirable that a uniformly horizontal alignment state is produced. In the liquid crystal device as shown in FIGS. 3A to 3C, since the horizontal alignment is realized by the horizontal alignment film, a chiral pitch length in a cholesteric liquid crystal (including a liquid crystal having a chiral reagent added thereto) is adjusted such that it is longer than a cell gap.

That is, in the liquid crystal device as shown in FIGS. 3A to 3C, a liquid crystal composition adjusted such that a ratio (P/G) of a chiral pitch length (P) with regard to the liquid crystal composition to a gap (G) between the pair of electrodes is thoroughly larger than 1 is applied. In general, (P/G) is about from 1.3 to 4.0.

Figure 4:
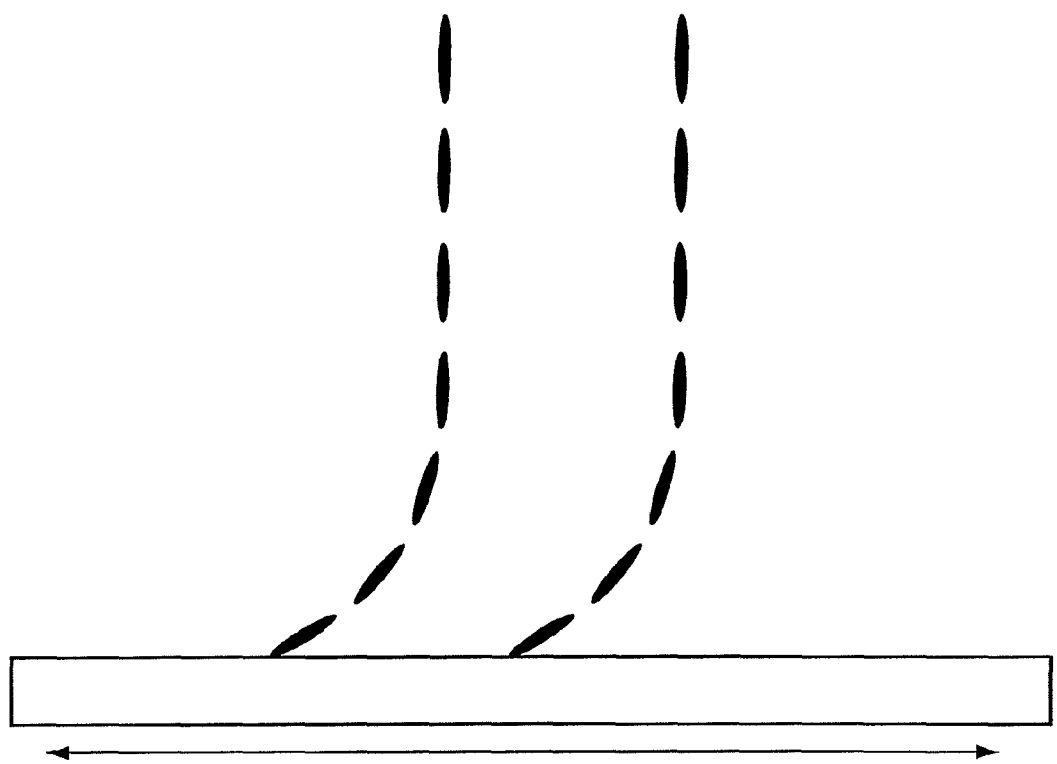
FIG. 4 is a schematic view explaining the behavior of alignment of a related-art liquid crystal in the vicinity of an electrode substrate when voltage is applied.

FIG. 4 is an enlarged view of the behavior of alignment of the liquid crystal in the vicinity of the alignment film in the case where voltage is applied in the state of horizontal alignment as shown in FIG. 3C, thereby changing the alignment to the vertical alignment as shown in FIG. 3A.

As shown in FIG. 4, liquid crystal molecules which are not completely aligned vertically exist in the vicinity of the alignment film due to influences of the horizontal alignment film. As a result, it has become clear that in displaying the transparent state as shown in FIG. 3A, the transparency is reduced due to influences of the liquid crystal molecules existing in the vicinity of the alignment film.

Figure 1B:
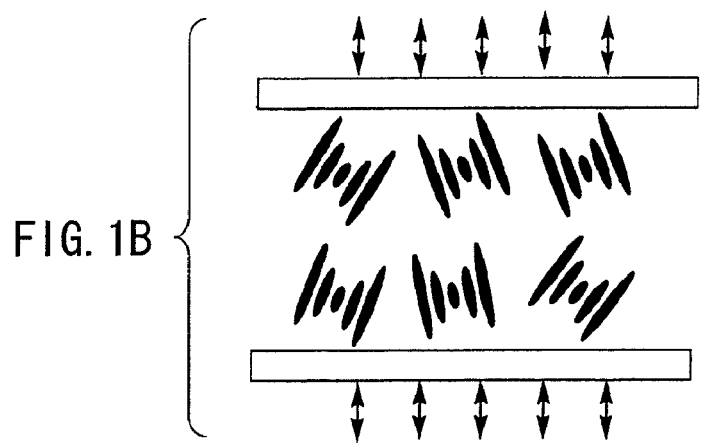
FIG. 1B shows alignment of the liquid crystal immediately after stopping the application of voltage.
Figure 1C:
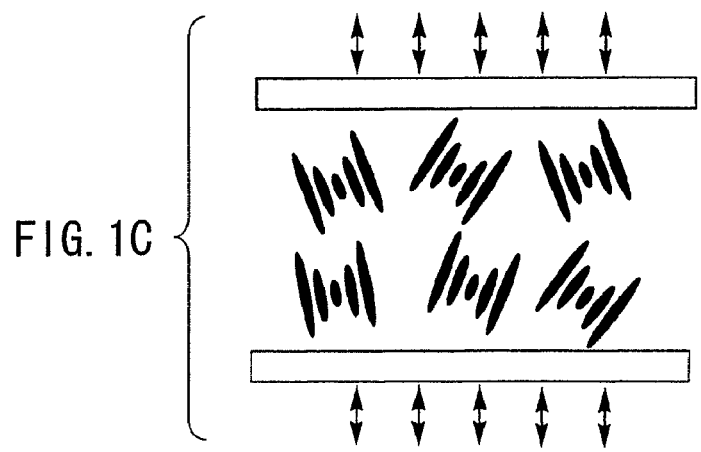
FIG. 1C shows alignment of the liquid crystal when a sufficient time has elapsed after stopping the application of voltage.

As opposed to the above-described related-art liquid crystal, in the liquid crystal device according to the present invention as shown in FIGS. 1A to 1C, a vertical alignment film and a liquid crystal with positive dielectric anisotropy are combined. In case of taking into consideration switching of display, an idea of the present invention that a liquid crystal with positive dielectric anisotropy (Δ∈) is combined with a vertical alignment film is epoch-making.

FIG. 1A is a schematic view showing alignment of a liquid crystal when voltage is applied; FIG. 1B is a schematic view showing alignment of a liquid crystal immediately after stopping the application of voltage; and FIG. 1C is a schematic view showing alignment of a liquid crystal when a sufficient time has elapsed after stopping the application of voltage.

Figure 2:
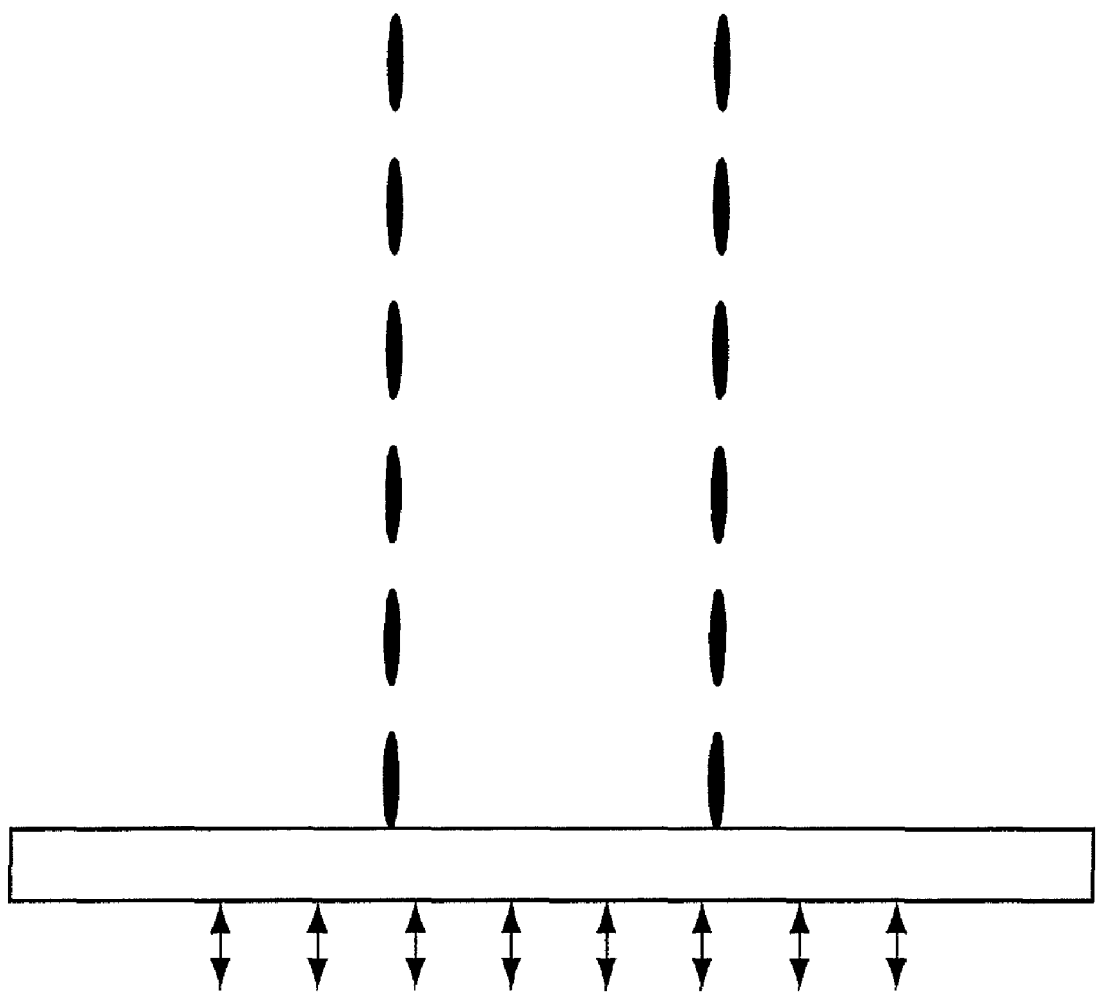
FIG. 2 is a schematic view explaining the behavior of alignment of a liquid crystal of the present invention in the vicinity of an electrode substrate when voltage is applied.

As shown in FIG. 1A, when voltage is applied, a liquid crystal with positive dielectric anisotropy is vertically aligned against an electrode. FIG. 2 is an enlarged view of the behavior of alignment of the liquid crystal in the vicinity of the alignment film in the case where voltage is applied. In the liquid crystal device of the present invention as shown in FIGS. 1A to 1C, since the vertical alignment film is applied, liquid crystal molecules in the vicinity of the electrode substrate are also vertically aligned as shown in FIG. 2. Accordingly, the transmittance in a transparent state becomes high.

When the application of voltage is stopped, as shown in FIG. 1B, the alignment of the liquid crystal is disturbed, and a colored and scattered state is produced due to partial light absorption of the dichroic dye and the influence of the refractive index anisotropy (Δn) of the liquid crystal.

Here, in the present invention, a chiral pitch length (P) of the liquid crystal composition and a gap (G) between the pair of electrodes are satisfied with the relationship of the above-described Expression (1). That is, since the chiral pitch length (P) of the liquid crystal composition is shorter than the gap between the pair of electrodes, a liquid crystal which is vertically aligned when influenced by the alignment film and a liquid crystal at a position sufficiently far from the alignment film, the alignment of which is disordered, coexist. As a result, the liquid crystal device of the present invention is able to maintain the colored and scattered state.

Like this, in the case where a liquid crystal with positive dielectric anisotropy (Δ∈) is combined with a vertical alignment film, it is important to adjust a P/G value.

Examples of the liquid crystal device in which the chiral pitch length (P) of the liquid crystal composition is shorter than the gap (G) between the pair of electrodes include devices in which a cholesteric liquid crystal composition is applied as developed by Kent State University (U.S. Pat. No. 5,453,863). However, the liquid crystal device by Kent State University is definitely different from the present invention as described below.

The cholesteric liquid crystal composition developed by Kent State University has an extremely short chiral pitch length and exhibits a so-called structural color. The structural color is exhibited when light having a specified wavelength causes black reflection. In the cholesteric liquid crystal, since a difference in refractive index periodically varies in the incident direction of light, Fresnel reflections generated at an interface with a different refractive index are superimposed to cause interference. When the chiral pitch length is made short such that light having a specified wavelength causes black reflection, a structural color is exhibited.

Figure 5A:
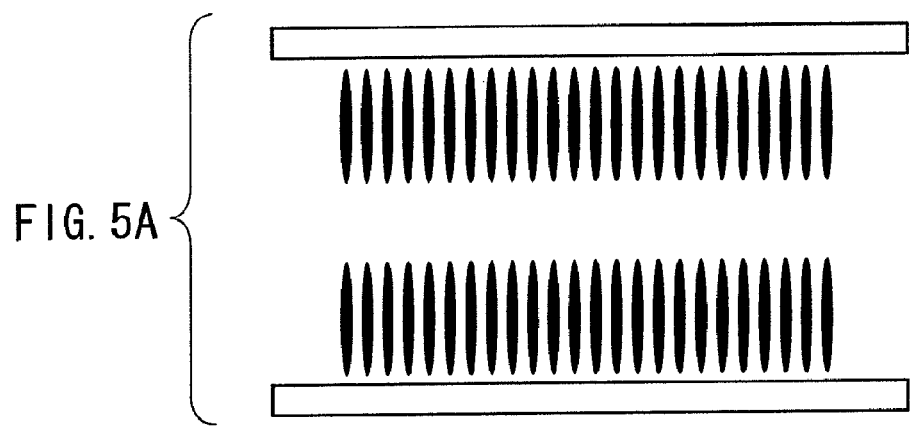
FIG. 5 is a schematic view explaining the behavior of alignment of a cholesteric liquid crystal exhibiting a structural color, in which FIG. 5A explains the behavior of the liquid crystal when high voltage is applied, and FIGS. 5B and 5C each explains the behavior of the liquid crystal when input of an pulse is changed to vertically or horizontally align the liquid crystal.
Figure 5B:
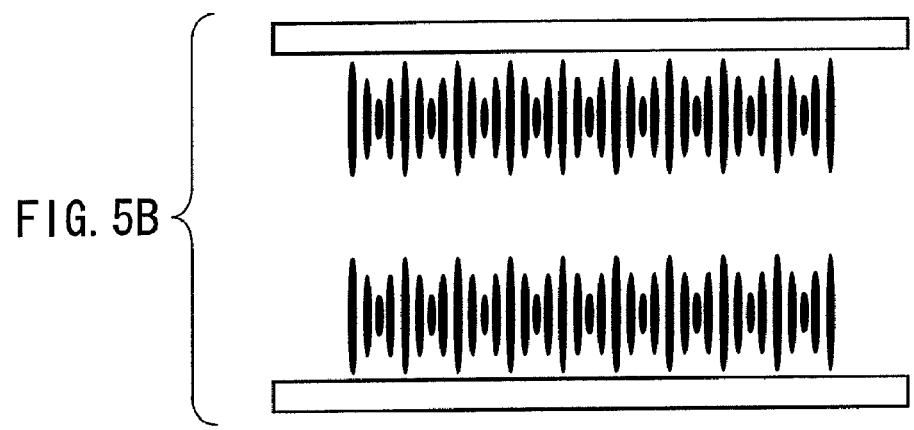
Figure 5C:
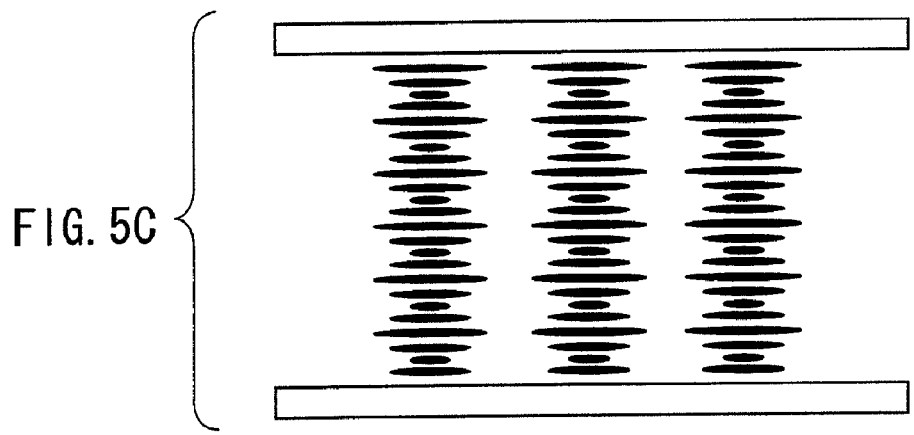

FIGS. 5A to 5C are each a schematic view explaining the behavior of alignment of a cholesteric liquid crystal assuming this structural color. In the liquid crystal device as shown in FIGS. 5A to 5C, a liquid crystal with positive dielectric anisotropy (Δ∈) is used.

In the cholesteric liquid crystal as shown in FIGS. 5A to 5C, first of all, high voltage is applied, whereby all liquid crystals are vertically aligned as shown in FIG. 5A. By changing the method for inputting a pulse from this state, the alignment state is switched as shown in FIG. 5B or FIG. 5C.

In the cholesteric liquid crystal as shown in FIGS. 5A to 5C, the chiral pitch length is extremely short, and a force for helically rotating it is strong. Therefore, it is possible to vertically align the liquid crystal without collapsing the helical state as shown in FIG. 5B depending upon the method for inputting a pulse. In the case where this liquid crystal contains a dichroic dye, the dichroic dye is also helically aligned in conformity with the alignment of the liquid crystal. As a result, a part of the dichroic dye absorbs light and exhibits a color in the alignment state as shown in FIG. 5B.

On the other hand, when a pulse is inputted by specified other method, a periodic structure in which light having a specified wavelength is able to cause black reflection is produced as shown in FIG. 5C. In this periodic structure, a difference in refractive index periodically varies relative with regard to the incident direction of light, and a structural color is exhibited.

That is, when a dichroic dye is added to the cholesteric liquid crystal as shown in FIGS. 5A to 5C, switching into the transparent state cannot be achieved. Therefore, in the cholesteric liquid crystal as shown in FIGS. 5A to 5C, it is impossible to apply a dichroic dye.

The chiral pitch length for assuming a structural color is short as compared with the pitch length as a lower limit according to the present invention.

Furthermore, a liquid crystal device using the cholesteric liquid crystal as shown in FIGS. 5A to 5C is one for achieving switching of display between the transparent state and the structural color, but does not suppose to achieve switching between the colored and scattered state and the transparent state as in the present invention.

Furthermore, details of materials to be used in the liquid crystal device of the present invention will be hereunder described.

The present invention will be described in detail below. In the present specification " . . . to . . . " represents a range including the numeral values represented before and after "to" as a minimum value and a maximum value, respectively.

<Vertical Alignment Film>

In the liquid crystal device of the present invention, an alignment film is provided, and this alignment film is a vertical alignment film.

As the alignment film, a polyimide, a polyamic acid or a mixture thereof, or a silane coupling agent is preferable; and from the viewpoints of alignment ability, durability and insulation properties, it is preferable to use a polyimide, a polyamic acid or a mixture thereof.

The alignment film may be or may not be subjected to a rubbing treatment and is preferably an alignment film having been subjected to a rubbing treatment.

Examples of the vertical alignment film are described below.

(1) Alignment films composed of a polyimide, a polyamic acid or a mixture thereof containing, as a side chain component, a long-chain alkyl group (preferably one having 12 or more carbon atoms; see Japanese Patent No. 3117103), a fluoroalkyl group, a steroid skeleton (see Japanese Patent No. 2893671), a tricyclic liquid crystal analogous group (see JP-A No. 2004-67589), or the like.

Specific examples of these compounds include commercially available vertical alignment films (for VA mode LCD) such as SE1211, SE5300 and SE5611 (all of which are manufactured by Nissan Chemical Industries, Ltd.), JALS-2096, AL60601 and JALS-2146 (all of which are manufactured by JSR Corporation) and PIA-X660 (manufactured by Chisso Corporation).

(2) Alignment films composed of a silane coupling agent (silanol) containing a long-chain alkyl group (one having 12 or more carbon atoms) or a long-chain fluoroalkyl group.

Specific examples of the silane coupling agent include N-octadecyltrimethoxysilane, N-octadecyltriethoxysilane, N-hexadecyltrimethoxysilane, N-hexadecyltriethoxysilane, N-octyltrimethoxysilane, N-octyltriethoxysilane, N-dodecyltrimethoxysilane, N-dodecyltriethoxysilane, trifluoropropyltrimethoxysilane, trifluoropropyltriethoxysilane, trifluoropropyltrichlorosilane, heptafluoropropyltrimethoxysiiane, heptafluoropropyltriethoxysilane and heptafluoropropyltrichlorosilane.

In order to maintain the colored and scattered state over a long period of time, it is preferable to apply an alignment film having a long-chain alkyl group (one having 12 or more carbon atoms) or a long-chain fluoroalkyl group.

In the liquid crystal device, the vertical alignment properties of the alignment film can be confirmed by the following method.

An alignment film is coated and baked on a transparent element, and a liquid crystal cell for testing is then prepared using a spherical spacer (for example, plastics and silica) and a sealing agent. A nematic liquid crystal not including a chiral reagent is injected into this liquid crystal cell, and the liquid crystal cell is observed by a polarizing microscope (crossed nicols). In the case where the alignment of the liquid crystal is not observed, it can be judged that the alignment film has vertical alignment properties.

<Liquid Crystal Composition>

In the liquid crystal device of the present invention, a liquid crystal layer containing a liquid crystal composition is provided between a pair of electrodes provided with a vertical alignment film, and the liquid crystal composition contains a liquid crystal with positive dielectric anisotropy, a dichroic dye and a chiral reagent.

(Liquid Crystal)

The liquid crystal which can be used in the liquid crystal composition according to the present invention is defined to be a compound having a function to change the alignment state due to an action of an electric field, thereby controlling the alignment state of the dichroic dye.

The liquid crystal according to the present invention (hereinafter sometimes referred to as "host liquid crystal") is not particularly limited so far as it exhibits positive dielectric anisotropy ($\Delta\epsilon$) and is able to coexist together with the dichroic dye. The liquid crystal according to the present invention is preferably a liquid crystal compound exhibiting a nematic phase. The liquid crystal compound exhibiting a nematic phase as referred to herein is a liquid crystal exhibiting a nematic phase at 25° C.

When a nematic liquid crystal is applied, voltage required for changing the arrangement state is low as compared with that in a cholesteric liquid crystal or a smectic liquid crystal. Furthermore, when a chiral reagent is combined thereto, there is an advantage that a helical structure is easily formed, thereby enhancing display performance.

The larger the dielectric anisotropy ($\Delta\epsilon$) of the liquid crystal, the smaller the threshold value of voltage is. Thus, such is favorable for reducing a consumed electric power. Accordingly, the dielectric anisotropy ($\Delta\epsilon$) is preferably 10 or more, and more preferably 20 or more.

The dielectric anisotropy ($\Delta\epsilon$) as referred to herein is defined as a difference between a dielectric constant ($\epsilon\parallel$) in the major axis direction of the liquid crystal molecule and a dielectric constant ($\epsilon\perp$) in the minor axis direction of the liquid crystal molecule.

$$\Delta\epsilon = \epsilon\parallel - \epsilon\perp$$

It is preferable that the refractive index anisotropy ($\Delta n$) of the nematic liquid crystal which is used in the present invention is large. This is because in the scattered state on the basis of a random focal conics state, when the $\Delta n$ of the nematic liquid crystal is large, the scattering intensity becomes high, whereby the display performance is enhanced.

The refractive index anisotropy ($\Delta n$) as referred to herein is defined as a difference between a refractive index ($n\parallel$) in the major axis direction of the liquid crystal molecule and a refractive index ($n\perp$) in the minor axis direction of the liquid crystal molecule.

$$\Delta n = n\parallel - n\perp$$

An actual range of the refractive index anisotropy ($\Delta n$) is from about 0.05 to about 0.4, and when the durability of the liquid crystal is taken into consideration, the refractive index anisotropy ($\Delta n$) is from about 0.08 to about 0.25.

Specific examples of the nematic liquid crystal compound include azomethine compounds, cyanobiphenyl compounds, cyanophenyl esters, phenyl esters, cyclohexanecarboxylic acid phenyl esters, phenylcyclohexane, phenylpyridine, phenyldioxane, tolan based compounds and alkenylcyclohexyl benzonitriles. Liquid crystal compounds described on pages 154 to 192 and pages 715 to 722 of *Liquid Crystal Handbook* (edited by the 142nd Committee in Japan Society for the Promotion of Science, The Nikkan Kogyo Shimbun, Ltd., 1989) can be used.

Examples thereof include liquid crystals manufactured by Merck (for example, E7, E100, ZLI-1132, 1565, 3700, 3926, 4792, MLC-6067-000, 6267, 6284, 6287, 6288, 6406, 6422 6423, 6425, 6435, 6437, 6481, 6486, 6492, 6499, 6629, 6633, 6657-000, 6828, 6844-000, 6848-000, 6873-000, 6873-100, 6893-000, 6893-100, 7001, 7003, 7018, 7020, 7021-000, 7021-100, 7022-000, 7022-100, 7023, 7700, 7800, 9000-000 9300-000, 12000-000, 13800-000, 13800-100, 13900-000, 13900-100, 15900-000, 15900-100, 16000-000, 16000-100, 114000-000, 114000-100, 116000-000, and 116000-100); liquid crystals manufactured by Chisso Corporation (for example, LIXON 5036xx, 5037xx, 5039xx, 5040xx and 5041xx); and liquid crystals manufactured by Asahi Denka Kogyo K.K. (for example, HA-11757 and CA-32150).

In the liquid crystal composition according to the present invention, from the viewpoint of strengthening scattering by increasing the refractive index anisotropy ($\Delta n$) or increasing the viscosity to make it easy to keep the scattered state or the like, it is preferable to use a liquid crystalline compound having four rings (tetracyclic liquid crystal). Furthermore, in the liquid crystalline compound having four rings, the transition temperature at which it exhibits liquid crystal properties is high.

The liquid crystalline compound having four rings is favorably a compound represented by the following Formula (I).

$$T^1\text{-}D^1\text{-}(L^1)_a\text{-}D^2\text{-}(L^2)_b\text{-}D^3\text{-}(L^3)_c\text{-}D^4\text{-}T^2 \qquad \text{Formula (I):}$$

In the Formula (I), $D^1$ to $D^4$ each independently represents an arylene group, a heteroarylene group or a bivalent cycloaliphatic hydrocarbon group; $L^1$ to $L^3$ each represents a bivalent linking group; $T^1$ represents an alkyl group or an alkoxy group; $T^2$ represents an alkyl group, a cyano group, a halogen atom, a nitro group, a perfluoroalkoxy group or a perfluoroalkyl group; and a to c each independently represents an integer of from 0 to 3.

The arylene group represented by $D^1$ to $D^4$ is preferably an arylene group having 6 to 20 carbon atoms, and more preferably 6 to 10 carbon atoms. Specific examples of preferred aryl groups include phenylene groups and naphthalene groups (for example, 1,4-phenylene group, naphthalene-2,6-diyl group, tetrahydronaphthalne-2,6-diyl group).

The heteroarylene group represented by $D^1$ to $D^4$ is preferably a heteroarylene group having 1 to 20 carbon atoms, and more preferably 2 to 9 carbon atoms. Specific examples of preferred heteroarylene groups include groups obtained by subtracting one hydrogen from each of two carbon atoms of pyridine ring, quinoline ring, isoquinoline ring, pyrimidine ring, pyrazine ring, thiophene ring, furan ring, oxazole ring, thiazole ring, imidazole ring, pyrazole ring, oxadiazole ring, thiadiazole ring, triazole ring, or a fused ring formed through condensation of these rings.

The cycloaliphatic hydrocarbon group represented by $D^1$ to $D^4$ is preferably a bivalent cycloaliphatic hydrocarbon group having 3 to 20 carbon atoms, and more preferably 4 to 12 carbon atoms. Specific examples of preferred bivalent cycloaliphatic hydrocarbon groups include cyclohexanediyl groups and decahydronaphthalenediyl groups. Of these groups, cyclohexane-1,4-diyl group and decahydronaphthalene-2,6-diyl group are more preferable.

$D^1$ to $D^4$ may each independently have the same substituent or a different substituent or may be each unsubstituted.

The following substituent groups V are enumerated as the substituent.

(Substituent Group V)

Halogen atoms (for example, chlorine, bromine, iodine, fluorine), the mercapto group, a cyano group, a carboxyl group, a phosphoric group, a sulfo group, a hydroxy group, a carbamoyl group having 1 to 10 carbon atoms, preferably 2 to 8 carbon atoms, and more preferably 2 to 5 carbon atoms (for example, methyl carbamoyl, ethyl carbamoyl, morpholinocarbamoyl), a sulfamoyl group having 0 to 10 carbon atoms, preferably 2 to 8 carbon atoms, and more preferably 2 to 5 carbon atoms (for example, methylsulfamoyl, ethylsulfamoyl, piperidinosulfamoyl), a nitro group, an alkoxy group having 1 to 20 carbon atoms, preferably 1 to 10 carbon atoms, and more preferably 1 to 8 carbon atoms (for example, methoxy, ethoxy, 2-methoxyethoxy, 2-phenylethoxy), an aryloxy group having 6 to 20 carbon atoms, preferably 6 to 12 carbon atoms, and more preferably 6 to 10 carbon atoms (for example, phenoxy, p-methylphenoxy, p-chlorophenoxy, naphthoxy), an acyl group having 1 to 20 carbon atoms, preferably 2 to 12 carbon atoms, and more preferably 2 to 8 carbon atoms (for example, acethy, benzoyl, trichloroacetyl), an acyloxy group having 1 to 20 carbon atoms, preferably having 2 to 12 carbon atoms, and more preferably 2 to 8 carbon atoms (for example, acetyloxy, benzoyloxy), an acylamino group having 1 to 20 carbon atoms, preferably having 2 to 12 carbon atoms, and more preferably 2 to 8 carbon atoms (for example, acetylamino), a sulfonyl group having 1 to 20 carbon atoms, preferably 1 to 10, and more preferably 1 to 8 carbon atoms (for example, methanesulfony, ethanesulfonyl, benzenesulfonyl), a sulfinyl groups having 1 to 20 carbon atoms, preferably 1 to 10, and more preferably 1 to 8 carbon atoms (for example, methanesulfinyl, ethanesulfinyl, benzenesulfinyl), a substituted or unsubstituted amino group having 1 to 20 carbon atoms, preferably 1 to 12 carbon atoms, and more preferably 1 to 8 carbon atoms (for example, amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphnylamino, 4-n-pentylphenylamino, 3-trifluoromethylphenylamino, 4-trifluoromethylphenylamino, 2-pyridylamino, 3-pyridylamino, 2-thiazolylamino, 2-oxazolylamino, N,N-methylphenylamino, N,N-ethylphenylamino), an ammonium group having 0 to 15 carbon atoms, preferably 3 to 10 carbon atoms, and more preferably 3 to 6 carbon atoms (for example, trimethylammonium, triethylammonium), a hydrazino group having 0 to 15 carbon atoms, preferably 1 to 10 carbon atoms, and more preferably 1 to 6 carbon atoms (for example, trimethylhydrazino), an ureido group having 1 to 15 carbon atoms, preferably 1 to 10 carbon atoms, and more preferably 1 to 6 carbon atoms (for example, ureido group, N,N-dimethylureido group), an imido group having 1 to 15 carbon atoms, preferably 1 to 10 carbon atoms, and more preferably 1 to 6 carbon atoms (for example, succinimide group), an alkylthio group having 1 to 20 carbon atoms, preferably 1 to 12 carbon atoms, and more preferably 1 to 8 carbon atoms (for example, methylthio, ethylthio, propylthio), an arylthio group having 6 to 80 carbon atoms, preferably 6 to 40 carbon atoms, and more preferably 6 to 30 carbon atoms (for example, phenylthio, p-methylphenylthio, p-chlorophenylthio, 2-pyridylthio, 1-naphthylthio, 2-naphthylthio, 4-propylcyelohexyl-4'-biphenylthio, 4-butylcyclohexyl-4'-biphenylthio, 4-pentylcyclohexyl-4'-biphenylthio, 4-propylphenyl-2-ethynyl-4'-biphenylthio), a heteroarylthio group having 1 to 80 carbon atoms, preferably 1 to 40 carbon atoms, and more preferably 1 to 30 carbon atoms (for example, 2-pyridylthio, 3-pyridylthio, 4-pyridylthio, 2-quinolylthio, 2-furilthio, 2-pyrrolylthio), an alkoxycarbonyl groups having 2 to 20 carbon atoms, preferably 2 to 12 carbon atoms, and more preferably 2 to 8 carbon atoms (for example, methoxycarbonyl, ethoxycarbonyl, 2-benzyloxycarbonyl), an aryloxycarbonyl group having 6 to 20 carbon atoms, preferably 6 to 12 carbon atoms, and more preferably 6 to 10 carbon atoms (for example, phenoxycarbonyl), an unsubstituted alkyl group having 1 to 18 carbon atoms, preferably 1 to 10 carbon atoms, and more preferably 1 to 5 carbon atoms (for example, methyl ethyl, propyl, butyl), a substituted alkyl group having 1 to 18 carbon atoms, preferably 1 to 10 carbon atoms, and more preferably 1 to 5 carbon atoms {for example, hydroxymethyl, trifluoromethyl, benzyl, carboxyethyl, ethoxycarbonylmethyl, acetylaminomethyl, moreover, in here, an unsaturated hydrocarbon group having 2 to 18 carbon atoms, preferably 3 to 10 carbon atoms, and more preferably 3 to 5 carbon atoms (for example, a vinyl group, an ethynyl group, an 1-cyclohexenyl group, a benzylidyne group, a benzylidene group) will be included in the substituted alkyl groups}, a substituted or unsubstituted aryl group having 6 to 20 carbon atoms, preferably 6 to 15 carbon atoms, and more preferably 6 to 10 carbon atoms (for example, phenyl, naphthyl, p-carboxyphenyl, p-nitrophenyl, 3,5-dichlorophenyl, p-cyanophenyl, m-fluorophenyl, p-tolyl, 4-propylcyelohexyl-4'-biphenyl, 4-butylcyclohexyl-4'-biphenyl, 4-pentylcyclohexyl-4'-biphenyl, 4-propylphenyl-2-ethynyl-4'-biphenyl), a substituted or unsubstituted heteroaryl group having 1 to 20 carbon atoms, preferably 2 to 16 carbon atoms, and more preferably 4 to 6 carbon atoms (for example, pyridyl, 5-methylpyridyl, thienyl, furyl, morpholino, tetrahydrofurfuryl).

Those substituent groups V may have a structure in which a benzene ring or a naphthalene ring is condensed. Further, the substituent illustrated by the explanation for V explained so far may further be substituted on the substituents described above.

Of the substituent groups V, an alkyl group, an alkoxy group, a halogen atom, a cyano group and a nitro group are preferable as the substituent of each of the bivalent arylene group, the bivalent heteroarylene group and the bivalent cycloaliphatic hydrocarbon group represented by $D^1$ to $D^4$.

In the Formula (I), $L^1$ to $L^3$ each represents a bivalent linking group, preferred examples of which include an alkanediyl group, an alkenylene group, an alkynylene group, an ether group, an ester group (—COO— or —OCO—), a carbonyl group, an azomethine group (—C=N— or —N=C—), an azo group, an azoxy group and an alkyleneoxy group, with an ester group and an azomethine group being more preferred.

In the Formula (I), $T^1$ represents an alkyl group or an alkoxy group. $T^1$ is an alkyl group having preferably 1 to 30 carbon atoms, more preferably 3 to 20 carbon atoms, and further preferably 3 to 10 carbon atoms (for example, n-propyl group, n-butyl group, n-pentyl group, n-hexyl group, n-nonyl group); or an alkoxy group having preferably 1 to 30 carbon atoms, more preferably 1 to 20 carbon atoms, and further preferably 1 to 10 carbon atoms (for example, methoxy, ethoxy, n-propyloxy group, n-butyloxy group, n-pentyloxy group, n-hexyloxy group, n-octyloxy group).

In the Formula (I), the substituent represented by $T^1$ may further have a substituent. The above-described substituent groups V are enumerated as the substituent.

In the Formula (I), $T^2$ represents an alkyl group, a cyano group, a halogen atom, a nitro group, a perfluoroalkoxy group or a perfluoroalkyl group, with an alkyl group, a cyano group and a halogen atom being preferred.

In the Formula (I), the substituent represented by $T^2$ may further have a substituent. The above-described substituent groups V are enumerated as the substituent.

In the Formula (I), a to c each independently represents an integer of from 0 to 3, and preferably 0 or 1.

Specific examples of the nematic liquid crystal compound which can be applied in the present invention are given below, but it should not be construed that the present invention is limited thereto.

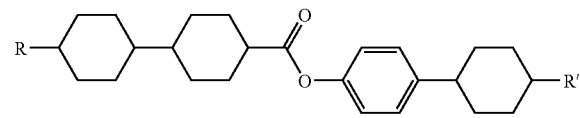

In the above-described specific examples of compounds, R and R' each represents an arbitrary functional group, and preferably represents $T^1$ or $T^2$.

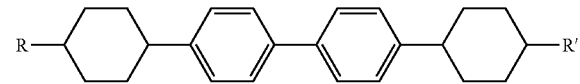

In the above-described specific examples of compounds, R and R' each represents an arbitrary functional group, and preferably represents $T^1$ or $T^2$.

Specific examples of the liquid crystalline compound having four rings include NKV-3-159-3, NKV-3-162-3, NKV-3-162-4 and NKV-3-162-5 (all of which are manufactured by Kanto Chemical Co., Inc.).

As a liquid crystal which even when a vertical alignment film is used, is able to maintain the colored and scattered state over a long period of time, for example, a mixture of a cyano group-containing liquid crystal compound (for example, cyanobiphenyl) with a tetracyclic liquid compound is preferable.

(Chiral Reagent)

Examples of the chiral reagent which can be used in the present invention include chiral reagents for TN or STN described on pages 199 to 202 of *Liquid Crystal Handbook* (edited by the 142nd Committee in Japan Society for the Promotion of Science, The Nikkan Kogyo Shimbun, Ltd., 1989).

When the chiral reagent is added, a cholesteric liquid crystal phase is formed, and a dichroic dye dissolved in a nematic liquid crystal is helically arranged. Accordingly, as to linearly polarized lights orthogonal to each other, since the both polarized lights can be absorbed, the absorption amount of light in a colored state increases. Thus, such is favorable. On the other hand, in case of using a uniaxially aligned nematic liquid crystal layer, only a half of the light is absorbed in theory.

The addition amount of the chiral reagent is properly adjusted in relation to the cell gap so as to satisfy the above-described Expression (1).

Specifically, the addition amount of the chiral reagent is preferably from 0.1% to 30% by mass, more preferably from 0.5% to 20% by mass, and further preferably from 1% to 10% by mass. When the addition amount of the chiral reagent exceeds 30% by mass, there may be the case where selective reflection is revealed in a visible region to cause a reduction in the light modulation performance, or there may be the case where the chiral reagent is easily deposited from the host liquid crystal.

A plural kind of chiral reagents may be used. In particular, the case where the use of a combination of one having positive temperature dependency of chiral pitch and one having negative temperature dependency of chiral pitch reduces the temperature dependency of chiral pitch is preferable.

Specific examples of the chiral reagent which is used in the present invention are given below.

Chiral Reagent 1

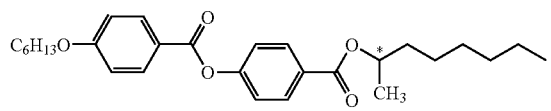

Chiral Reagent 2

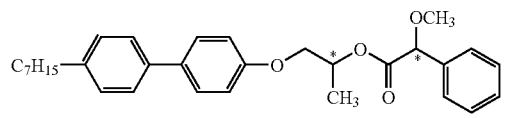

-continued
Chiral Reagent 3
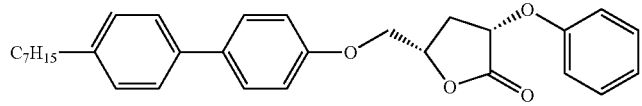
Chiral Reagent 4
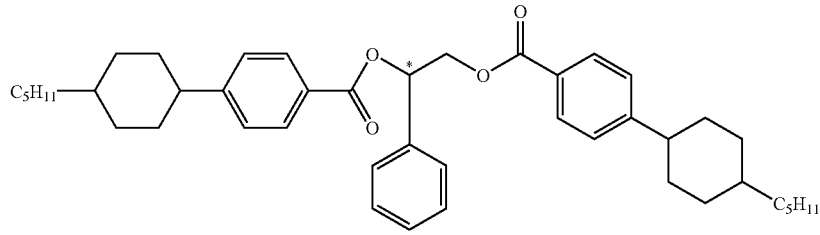
Chiral Reagent 5
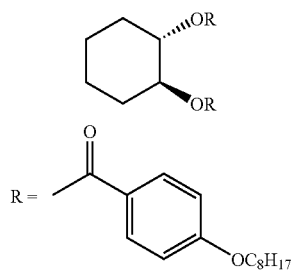
Chiral Reagent 6
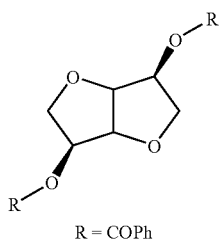
R = COPh
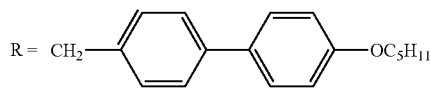
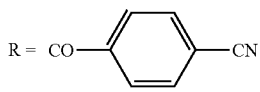
Chiral Reagent 7
R = CH₂—⟨⟩—⟨⟩—OC₅H₁₁
Chiral Reagent 8
R = CO—⟨⟩—CN
Chiral Reagent 9
R = CO—t-Bu
Chiral Reagent 10
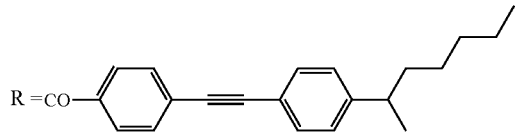
Chiral Reagent 11
R = CH₂—⟨⟩—⟨⟩—C₅H₁₁
Chiral Reagent 12
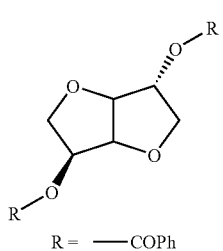
R = —COPh
Chiral Reagent 13
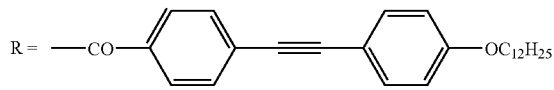
Chiral Reagent 14
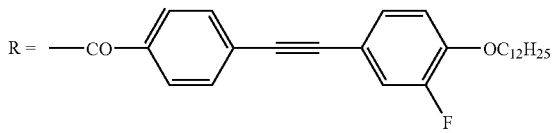
Chiral Reagent 15
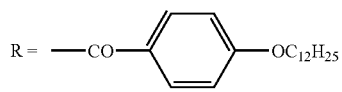
Chiral Reagent 16
R = —CO-t-Bu
Chiral Reagent 17
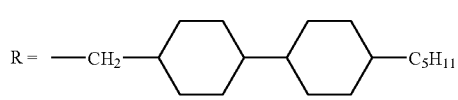

-continued

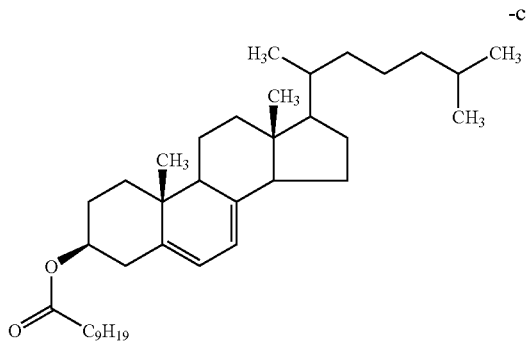

Chiral Reagent 18

In the present invention, from the viewpoint of reducing a viscosity of liquid crystal, as a chiral reagent, it is preferable to use the above the chiral reagent 1, chiral reagent 4 or chiral reagent 18.

It is also preferable to use commercially available chiral reagent such as R-1011, S-1011, R-2011, S-2011, R-811, S-811 and CB-15 (all of which are manufactured by Merck), CNL-611L, CNL-617L, CNL-659R (all of which are manufactured by Asahi Denka Kogyo K. K).

(Dichroic Dye)

In the present invention, the dichroic dye is defined to be a compound capable of being dissolved in the liquid crystal and having a function to absorb light. So far as absorption maximum and absorption band are concerned, any dichroic dye is useful as the dichroic dye according to the present invention. However, those having absorption in a visible region of 400 nm to 680 nm are preferable, and those having absorption maximum in a yellow region (Y), a magenta region (M) or a cyan region (C) are more preferable.

Two or more kinds of dichroic dyes may be used, and a mixture of dichroic dyes having absorption maximum in Y, M and C is preferable. Details of a method for revealing full color display by mixing a yellow dye, a magenta dye and a cyan dye are described in *Color Chemistry* (written by TOKITA, Sumio, Maruzen, 1982). Here, the yellow region refers to a range of 430 to 490 nm; the magenta region refers to a range of 500 to 580 nm; and the cyan region refers to a range of 600 to 700 nm.

Next, a chromophore to be used for the dichroic dye of the present invention will be described.

Any chromophoric group of the dichroic dye may be used, including, for example, azo dyes, anthraquinone dyes, perylene dyes, merocyanine dyes, azomethine dyes, phthaloperylene dyes, indigo dyes, azulene dyes, dioxadine dyes, polythiophene dyes, or phenoxadine dyes. Preferred are azo dyes, anthraquinone dies, phenoxazine dyes, and particularly preferred are anthraquinone dyes, or phenoxazone dyes (phenoxazine-3-one).

The azo dyes may be any of monoazo dyes, bisazo dyes, trisazo dyes, tetrakisazo dyes, and pentakisazo dyes, and preferred are monoazo dyes, bisazo dyes, or trisazo dyes.

The cyclic structure contained in the azo dye may be heterocyclic rings (a quinone ring, a pyridine ring, a thiazole ring, a benzothiazole ring, an oxazole ring, a benzooxazole ring, an imidazole ring, a benzoimidazole ring, a pyrimidine ring, or the like) in addition to aromatic groups (a benzene ring, a naphthalene ring, or the like).

The substituent for the anthraquinone dye is preferably those containing an oxygen atom, a sulfur atom, or a nitrogen atom; and includes, for example, an alkoxy group, an aryloxy group, an alkylthio group, an arylthio group, an alkylamino group, or an arylamino group. The number of substitution of the substituent may be of any number and di-substitution, tri-substitution, or tetrakis-substitution is preferred, and di-substitution or tri-substitution is particularly preferred. The substitution of the substituent may be at any position and preferred structure is 1,4-di-substitution, 1,5-di-substitution, 1,4,5-tri-substitution, 1,2,4-tri-substitution, 1,2,5-tri-substitution, 1,2,4,5-tetra-substitution, or 1,2,5,6-tetra-substitution.

The substituent for the phenoxazone dye (phenaxazin-3-on) is preferably those containing an oxygen atom, a sulfur atom, or a nitrogen atom; and includes, for example, an alkoxy group, an aryloxy group, an alkylthio group, an arylthio group, an alkylamino group, or an arylamino group.

From the viewpoint that high solubility in a nematic liquid crystal and high order parameter are compatible with each other, it is preferable that the dichroic dye which is used in the liquid crystal device of the present invention has at least one substituent represented by the following Formula (1).

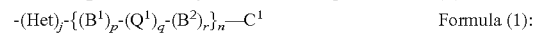  Formula (1):

In Formula (1), Het is an oxygen atom or a sulfur atom; $B^1$ and $B^2$ each independently represent an arylene group, a heteroarylene group or a bivalent cyclic aliphatic hydrocarbon group; $Q^1$ represents a bivalent linking group; $C^1$ represents an alkyl group, a cycloalkyl group, an alkoxy group, an alkoxycarbonyl group, an acyl group, or an acyloxy group; j represents 0 or 1; p, q and r each independently represent an integer of from 0 to 5; n represents an integer of from 1 to 3; (p+r)×n is an integer of from 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $\{(B^1)_p\text{-}(Q^1)_q\text{-}(B^2)_r\}$ may be the same or different.

Het is an oxygen atom or a sulfur atom, particularly preferably a sulfur atom.

$B^1$ and $B^2$ each independently represent an arylene group, a heteroarylene group, or a bivalent cyclic aliphatic hydrocarbon group, and any group may have or not have a substituent.

The arylene group represented by $B^1$ and $B^2$ is preferably an arylene group having 6 to 20 carbon atoms, more preferably 6 to 10 carbon atoms. Specific examples of preferred arylene group include, for example, phenylene group, naphthalene group, and anthracene group, particularly preferably an unsubstituted phenylen group or a substituted phenylen group, and further preferably 1,4-phenylene group.

The heteroarylene group represented by $B^1$ and $B^2$ is preferably an heteroarylene group having 1 to 20 carbon atoms, and more preferably an heteroarylene group having 2 to 9 carbon atoms. Specific examples of preferred heteroarylene group include, for example, a group comprising pyridine ring, quinoline ring, isoquinoline ring, pyrimidine ring, pyrazine ring, thiophene ring, furan ring, oxazole ring, thiazole ring, imidazole ring, pyrazole ring, oxadiazole ring, thiadiazole ring, and triazole ring, as well as a heteroarylene group obtained by eliminating hydrogen atoms each by one from two carbon atoms in a condensed ring formed by ring condensation thereof.

The bivalent cycloaliphatic hydrocarbon group represented by $B^1$ and $B^2$ is preferably a bivalent cycloaliphatic hydrocarbon group having preferably 3 to 20 carbon atoms, more preferably 4 to 10 carbon atoms. Specific examples of preferred bivalent cycloaliphatic hydrocarbon group include a cyclohexanediyl or cyclopentanediyl, more preferably cyclohexane-1,2-diyl, cyclohexane-1,3-diyl, cyclohexane-1,4-diyl, or cyclopentane-1,3-diyl, particularly preferably (E)-cyclohexane-1,4-diyl.

An arylene group, a heteroarylene group, and a bivalent cyclic aliphatic hydrocarbon group represented by $B^1$ and $B^2$ may further have a substituent, and the substituent includes the above substituent group V.

Among the substituent groups V, a preferred substituents include an above-described alkyl group, an aryl group, an alkoxy group, an aryloxy group, halogen atom, amino group, a substituted amino group, a hydroxy group, an alkylthio group, or an arylthio group, and further preferably an alkyl group, an aryl group, or halogen atom.

$Q^1$ represents a bivalent linking group. $Q^1$ is preferably a linking group composed of an atomic group constituted of at least one atom selected from a carbon atom, a nitrogen atom, a sulfur atom and an oxygen atom. Examples of the bivalent linking group represented by $Q^1$ include bivalent linking groups having 0 to 60 carbon atoms and constituted of one or a combination of an alkylene group having preferably 1 to 20 carbon atoms, and more preferably 1 to 10 carbon atoms (for example, methylene, ethylene, propylene, butylene, pentylene, cyclohexyl-1,4-diyl), an alkenylene group having preferably 2 to 20 carbon atoms, and more preferably 2 to 10 carbon atoms (for example, ethenylene), an alkynylene group having preferably 2 to 20 carbon atoms, and more preferably 2 to 10 carbon atoms (for example, ethynylene), an amide group, an ether group, an ester group, a sulfonamide group, a sulfonic ester group, a ureido group, a sulfonyl group, a sulfinyl group, a thioether group, a carbonyl group, an —NR— group (wherein R represents hydrogen atom, an alkyl group or an aryl group; the alkyl group represented by R is preferably an alkyl group having 1 to 20 carbon atoms, and more preferably 1 to 10 carbon atoms; and the aryl group represented by R is preferably an aryl group having 6 to 14 carbon atoms, and more preferably 6 to 10 carbon atoms), an azo group, an azoxy group and a heterocyclic bivalent group (preferably a heterocyclic bivalent group having 2 to 20 carbon atoms, and more preferably 4 to 10 carbon atoms, for example, piperazine-1,4-diyl group).

As a bivalent linking group represented by $Q^1$, an alkylene group, an alkenylene group, an alkynylene group, an ether group, a thioether group, an amide group, an ester group, a carbonyl group, or a combination of two or more of them is preferable.

$Q^1$ may further have a substituent, and the substituent group V is enumerated as the substituent.

$C^1$ represents an alkyl group, a cycloalkyl group, an alkoxy group, an alkoxycarbonyl group, an acyl group, or an acyloxy group. The alkyl group, the cycloalkyl group, the alkoxy group, the alkoxycarbonyl group, the acyl group, or the acyloxy group, which is represented by $C^1$, is also included each group which has a substituent.

$C^1$ preferably represents an alkyl or a cycloalkyl group having 1 to 30 carbon atoms, more preferably 1 to 12 carbon atoms, and further preferably 1 to 8 carbon atoms (for example, methyl, ethyl, propyl, butyl, t-butyl, i-butyl, s-butyl, pentyl, t-pentyl, hexyl, heptyl, octyl, cyclohexyl, 4-methylcyclohexyl, 4-ethylcyclohexyl, 4-propylcyclohexyl, 4-butylcyclohexyl, 4-pentylcyclohexyl, hydroxymethyl, trifluoromethyl, benzyl), an alkoxy group having 1 to 20 carbon atoms, more preferably 1 to 10 carbon atoms, and further preferably 1 to 8 carbon atoms (for example, methoxy, ethoxy, 2-methoxyethoxy, 2-phenylethoxy), an acyloxy group having 1 to 20 carbon atoms, more preferably 2 to 12 carbon atoms, and further preferably 2 to 8 carbon atoms (for example, acetyloxy, benzoyloxy), an acyl group having 1 to 30 carbon atoms, more preferably 1 to 12 carbon atoms, and further preferably 1 to 8 carbon atoms (for example, acetyl, formyl, pivaloyl, 2-chloroacetyl, stearoyl, benzoyl, p-n-octyloxyphenylcarbonyl), or an alkoxycarbonyl group having 2 to 20 carbon atoms, more preferably 2 to 12 carbon atoms, and further preferably 2 to 8 carbon atoms (for example, methoxycarbonyl, ethoxycarbonyl, 2-benzyloxycarbonyl).

$C^1$ represents particularly preferably an alkyl group or an alkoxy group, and more preferably ethyl, propyl, butyl, pentyl, hexyl, or trifluoromethoxy.

$C^1$ may further have a substituent, and the substituent group V is enumerated as the substituent.

A substituent for the alkyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, or an aryloxycarbonyl group.

A substituent for the cycloalkyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, an aryloxycarbonyl group, or an alkyl group.

A substituent for the alkoxy group represented by $C^1$ preferably includes, among the substituent group V, a halogen atom (particularly, fluorine atom), a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, or an aryloxycarbonyl group.

A substituent for the alkoxycarbonyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

A substituent for the acyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an alkylthio group, an arylthio group, a heteroarylthio group, an alkoxycarbonyl group, or an aryloxycarbonyl group.

A substituent for the acyloxy group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, or an aryloxycarbonyl group.

j represents 0 or 1, and preferably 0.

p, q and r each independently represent an integer of from 0 to 5, and n represents an integer of from 1 to 3. The total number of the groups represented by $B^1$ and $B^2$, that is, $(p+r) \times n$ is an integer of from 3 to 10, more preferably an integer of from 3 to 5. When p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $\{(B^1)_p\text{-}(Q^1)_q\text{-}(B^2)_r\}$ may be the same or different.

Preferable combinations of p, q, r, and n will be described as follows.

(i) p=3, q=0, r=0, n=1
(ii) p=4, q=0, r=0, n=1
(iii) p=5, q=0, r=0, n=1
(iv) p=2, q=0, r=1, n=1
(v) p=2, q=1, r=1, n=1
(vi) p=1, q=1, t=2, n=1
(vii) p=3, q=1, r=1, n=1
(viii) p=2, q=0, r=2, n=1
(ix) p=1, q=1, r=1, n=2
(x) p=2, q=1, r=1, n=2

Particularly preferable combinations are (i) p=3, q=0, r=0, n=1; (vi) p=1, q=1, t=2, n=1; (iv) p=2, q=0, r=1, n=1; and (v) p=2, q=1, r=1, n=1.

Further, $-\{(B^1)_p\text{-}(Q^1)_q\text{-}(B^2)_r\}_n-C^1$ is preferable to contain a partial structure to exhibit the liquid crystal property. Herein, the liquid crystal may be any phase, preferably is a nematic liquid crystal, a smectic liquid crystal, or a discotic liquid crystal, and particularly preferably a nematic liquid crystal.

Specific examples of $-\{(B^1)_p\text{-}(Q^1)_q\text{-}(B^2)_r\}_n-C^1$ are shown below, but the present invention should not be limited to them (in the following chemical formulas, the wavy line shows the connecting position).

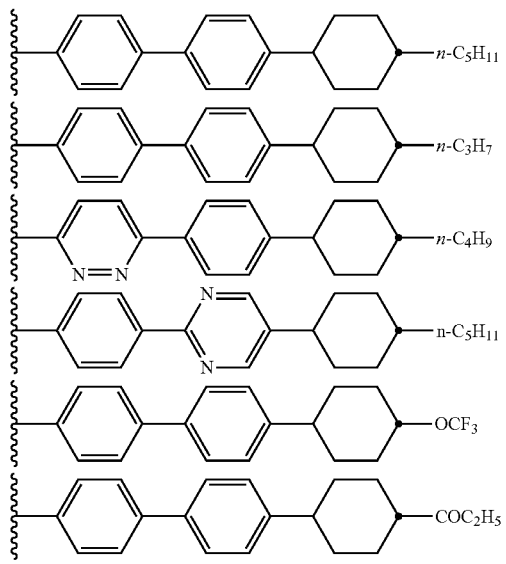

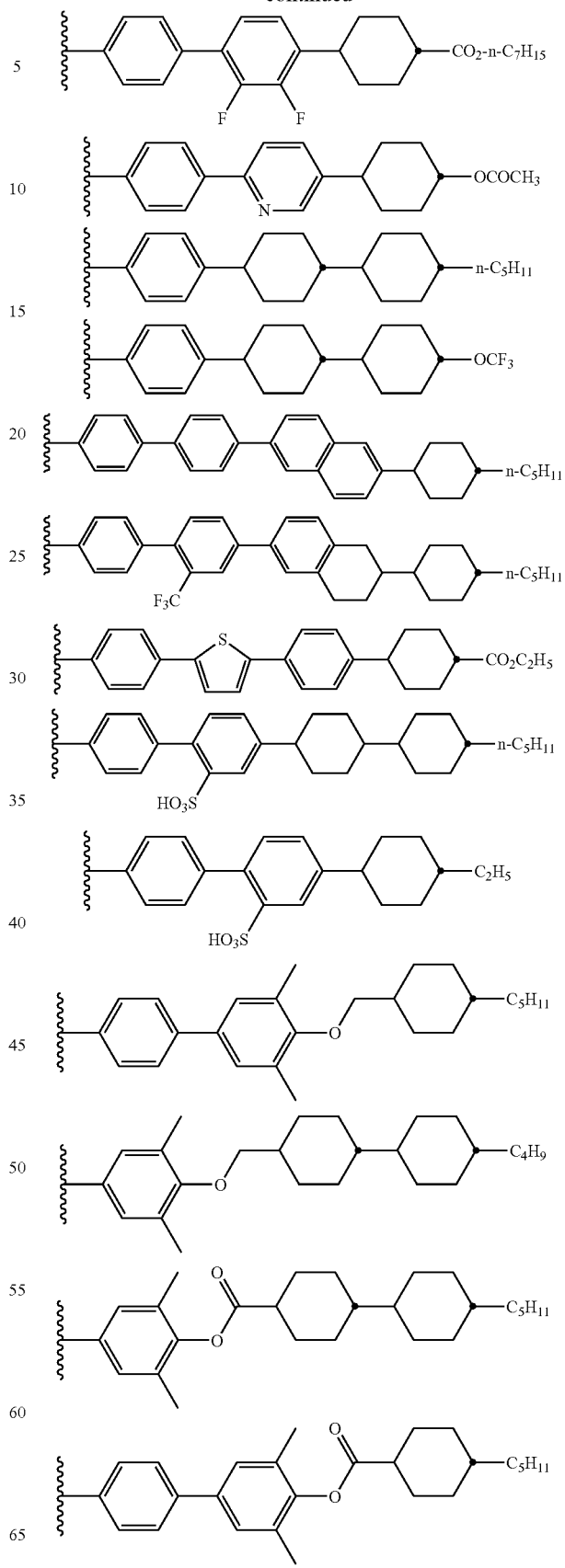

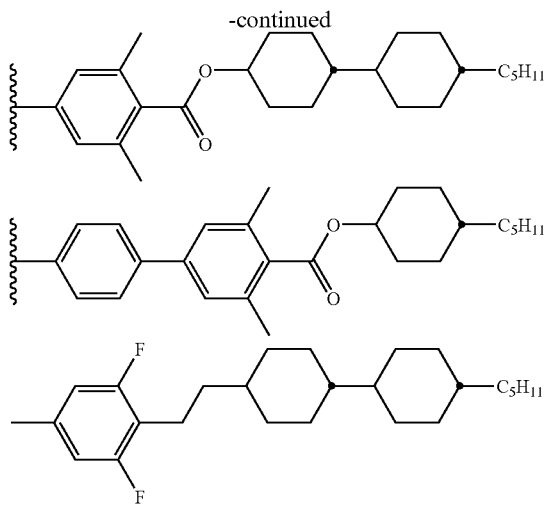

The dichroic dye used in the present invention has preferably one or more, more preferably from 1 to 8, further preferably from 1 to 4, and particularly preferably 1 or 2 of substituents represented by $-\{(B^1)_p\text{-}(Q^1)_q\text{-}(B^2)_r\}_n\text{-}C^1$.

A preferred structure of the substituent represented by the Formula (1) includes combinations described below.

[1] A structure in which Het represents a sulfur atom, $B^1$ represents an aryl group or a heteroaryl group, $B^2$ represents cyclohexane-1,4-diyl group, $C^1$ represents an alkyl group, and j=1, p=2, q=0, r=1, and n=1.

[2] A structure in which Het represents a sulfur atom, $B^1$ represents an aryl group or a heteroaryl group, $B^2$ represents cyclohexane-1,4-diyl group, $C^1$ represents an alkyl group, and j=1, p=1, q=0, r=2 and n=1.

Especially preferred structures are:

[I] a structure represented by the following Formula (a-1), in which Het represents a sulfur atom, $B^1$ represents a 1,4-phenylene group, $B^2$ represents a trans-cyclohexyl group, $C^1$ represents an alkyl group (preferably, methyl, ethyl, propyl, butyl, pentyl, or hexyl), and j=1, p=2, q=0, r=1 and n=1,

[II] a structure represented by the following Formula (a-2), in which Het represents a sulfur atom, $B^1$ represents 1,4-phenylene, $B^2$ represents trans-cyclohexane-1,4-diyl, $C^1$ represents an alkyl group (preferably, methyl, ethyl, propyl, butyl, pentyl, or hexyl), and j=1, p=1, q=0, r=2 and n=1, and

[III] a structure represented by the following Formula (a-3), in which Het represents a sulfur atom, $B^1$ represents 1,4-phenylene, $Q^1$ represents a ether group A, $B^2$ represents trans-cyclohexyl group, $C^1$ represents an alkyl group R (preferably, methyl, ethyl, propyl, butyl, pentyl, or hexyl), and j=1, p=2, q=1, r=1 and n=1.

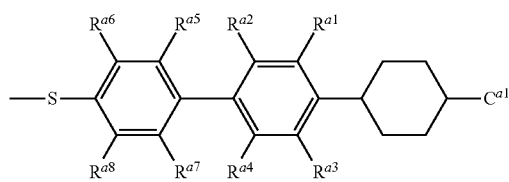

Formula (a-1)

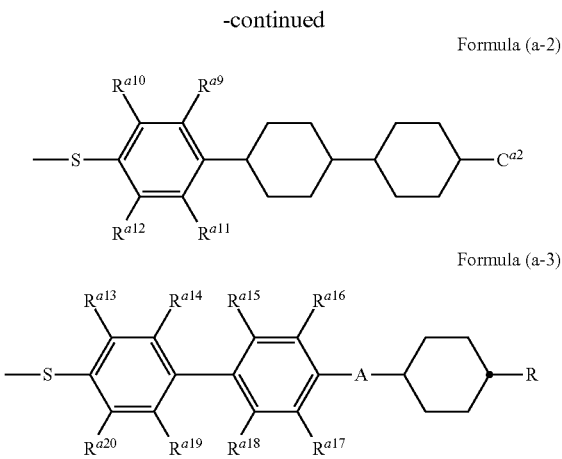

In the Formulae (a-1) to (a-3), $R^{a1}$ to $R^{a20}$ each independently represent a hydrogen atom or a substituent. The substituent includes, for example, a substituent selected from the substituent group V.

$R^{a1}$ to $R^{a20}$ each independently represents preferably hydrogen atom, a halogen atom (particularly, fluorine atom), an alkyl group, an aryl group, and an alkoxy group. Among the alkyl group, aryl group, and alkoxy group represented by $R^{a1}$ to $R^{a20}$, preferred are those identical with the alkyl group, aryl group, and alkoxy group described for the substituent group V.

In the Formulae (a-1) and (a-2), $C^{a1}$ and $C^{a2}$ each independently represent an alkyl group, and an alkyl group having preferably 1 to 20 carbon atoms, more preferably 1 to 10 carbon atoms, and particularly preferably methyl, ethyl, propyl, butyl, pentyl, hexyl, heptyl, octyl, or nonyl.

In the above-described Formulae (a-1) and (a-2), as to the substituent represented by the above-described Formula (1), the case where $C^{a1}$ and $C^{a2}$ each represents a long-chain alkyl group having 3 to 10 carbon atoms is especially favorable for the liquid crystal device because the solubility in the host liquid crystal is enhanced, and the absorption amount of light in a colored state increases. Though the reasons for this have not been elucidated yet, it is estimated that the compatibility with the host liquid crystal is enhanced.

In the Formula (a-3), the ether group A represents an ether group (—O—), or a combination of an ether group and alkylene group (i.e., —O—$C_nH_{2n}$—, —$C_nH_{2n}$—O—, —$C_nH_{2n}$—O—$C_nH_{2n}$—), preferably —O—$C_nH_{2n}$—, and more preferably —O—$CH_2$—.

The azo dye may be any of monoazo dye, bisazo dye, trisazo dye, tetrakisazo dye, or pentakisazo dye, and preferably a monoazo dye, bisazo dye or trisazo dye.

A ring structure contained in the azo dye includes, in addition to aromatic groups (benzene ring, naphthalene ring, or the like), hetero rings (quinoline ring, pyridine ring, thiazole ring, benzothiazole ring, oxazole ring, benzooxazole ring, imidazole ring, benzoimidazole ring, pyrimidine ring, or the like).

The substituent for the anthraquione dye preferably includes those containing an oxygen atom, a sulfur atom or a nitrogen atom, for example, an alkoxy group, an aryloxy group, an alkylthio group, an arylthio group, an alkylamino group, or an arylamino group.

While the number of substitution for the substituent may be of any number, and di-substitution, tri-substitution, or tetra-substitution is preferred, and di-substitution or tri-substitution is particularly preferred. The substitution of the substituent may be at any position adopted, and preferred are 1,4-di-substitution, 1,5-di-substitution, 1,4,5-tri-substitution, 1,2,4-tri-substitution, 1,2,5-tri-substitution, 1,2,4,5-tetra-substitution, and 1,2,5,6-tetra-substitution structure.

The anthraquinone dye is more preferably a compound represented by the following Formula (2), and one of the preferable embodiments of the anthraquinone dyes is a compound having a structure represented by the following Formula (4). The phenoxazone dye is more preferably a compound represented by the following formula (3).

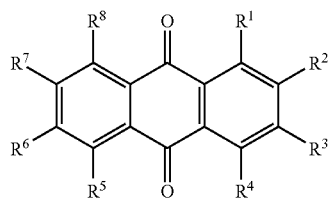

Formula (2)

In the Formula (2), at least one of $R^1$, $R^2$, $R^3$, $R^4$, $R^5$, $R^6$, $R^7$ and $R^8$ represents $-(Het)_j-\{(B^1)_p-(Q^1)_q-(B^2)_r\}_n-C^1$, and others each independently represents hydrogen atom or a substituent.

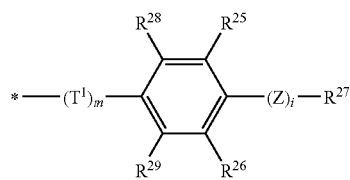

Formula (4)

In the Formula (4), $R^{25}$ and $R^{26}$ each independently represent an alkyl group, a halogen atom or an alkoxy group; $R^{27}$ represents an alkyl group, an acyl group or an alkoxy group; $R^{28}$ and $R^{29}$ each independently represent a hydrogen atom or a substituent group; $T^1$ represents an arylene or a heteroarylene group; Z represents an oxygen atom, a sulfur atom or a carbonyl group; m represents an integer of from 0 to 2; i represents 0 or 1. When i represents 1 and Z represents an oxygen atom or a sulfur atom, $R^{27}$ is not an alkoxy group. When i represents 1 and Z represents a carbonyl group, R27 is not an acyl group. "*" represent a binding position.

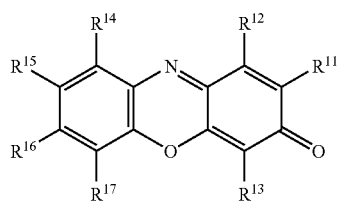

Formula (3)

In the formula (3), at least one or more of $R^{11}$, $R^{12}$, $R^{13}$, $R^{14}$, $R^{15}$, $R^{16}$, and $R^{17}$, represents $-(Het)_j-\{(B^1)_p-(Q^1)_q-(B^2)_r\}_n-C^1$, and the others each independently represents a hydrogen atom or a substituent.

Here, Het, $B^1$, $B^2$, $Q^1$, j, p, q, r, n, and $C^1$ have the same definitions as Het, $B^1$, $B^2$, $Q^1$, j, p, q, r, n, and $C^1$ in the formula (1).

In the formula (2), the above substituents represented by $R^1$, $R^2$, $R^3$, $R^4$, $R^5$, $R^6$, $R^7$, and $R^8$ include the substituent group V, preferably include arylthio groups having 6 to 80 carbon atoms, more preferably 6 to 40 carbon atoms, and further preferably 6 to 30 carbon atoms (for example, phenylthio, p-methylphenylthio, p-chlorophenylthio, 4-methylphenylthio, 4-ethylphenylthio, 4-n-propylphenylthio, 2-n-butylphenylthio, 3-n-butylphenylthio, 4-n-butylphenylthio, 2-t-butylphenylthio, 3-t-butylphenylthio, 4-t-butylphenylthio, 3-n-pentylphenylthio, 4-n-pentylphenylthio, 4-amylpentylphenylthio, 4-hexylphenylthio, 4-heptylphenylthio, 4-octylphenylthio, 4-trifluoromethylphenylthio, 3-trifluoromethylphenylthio, 2-pyridylthio, 1-naphthylthio, 2-naphthylthio, 4-propylcyclohexyl-4'-biphenylthio, 4-butylcyclohexyl-4'-biphenylthio, 4-pentylcyclohexyl-4'-biphenylthio, 4-propylphenyl-2-ethynyl-4'-biphenylthio), a heteroarylthio group having 1 to 80 carbon atoms, more preferably 1 to 40 carbon atoms, and further preferably 1 to 30 carbon atoms (for example, 2-pyridylthio, 3-pyridylthio, 4-pyridylthio, 2-quinolylthio, 2-furylthio, 2-pyrrolylthio), a substituted or unsubstituted alkylthio groups (for example, methylthio, ethylthio, butylthio, phenethylthio), a substituted or unsubstituted amino group (for example, amino, methylamino, dimethylamino, benzylamino, anilino, diphenylamino, 4-methyphenylamino, 4-ethylphenylamino, 3-n-propylphenylamino, 4-n-propylphenylamino, 3-n-butylphenylamino, 4-n-butylphenylamino, 3-n-pentylphenylamino, 4-n-pentylphenylamino, 3-trifluoromethyphenylamino, 4-trifluoromethylphenylamino, 2-pyridylamino, 3-pyridylamino, 2-thiazolylamino, 2-oxazolylamino, N,N-methylphenylamino, N,N-ethylphenylamino), a halogen atom (for example, a fluorine atom, a chlorine atom), a substituted or unsubstituted alkyl group (for example, methyl, trifluoromethyl), a substituted or unsubstituted alkoxy group (for example, methoxy, trifluoromethoxy), a substituted or unsubstituted aryl group (for example, phenyl), a substituted or unsubstituted heteroaryl group (for example, 2-pyridyl), a substituted or unsubstituted aryloxy group (for example, phenoxy), a substituted or unsubstituted heteroaryloxy group (for example, 3-thienyloxy), and the like.

$R^1$, $R^2$, $R^3$, $R^4$, $R^5$, $R^6$, $R^7$, and $R^8$ are preferably a hydrogen atom, a fluorine atom, a chlorine atom, and a substituted or unsubstituted arylthio group, alkylthio group, amino group, alkylamino group, arylamino group, alkyl group, aryl group, alkoxy group, or aryloxy group, and particularly preferably a hydrogen atom, a fluorine atom, and a substituted or unsubstituted arylthio group, alkylthio group, amino group, alkylamino group, or arylamino group.

Moreover, in the formula (2), at least one of $R^1$, $R^4$, $R^5$, and $R^8$ is further preferably $-(Het)_j-\{(B^1)_p-(Q^1)_q-(B^2)_r\}_n-C^1$.

In the formula (3), the substituents represented by $R^{11}$, $R^{12}$, $R^{13}$, $R^{14}$, $R^{15}$, $R^{16}$, and $R^{17}$ include a halogen atom, an alkyl group, an aryl group, an alkylthio group, an arylthio group, a heterothio group, a hydroxyl group, an alkoxy group, an aryloxy group, a carbamoyl group, an acyl group, an aryloxycarbonyl group, an alkoxycarbonyl group, or an amido group, and particularly preferably a hydrogen atom, a halogen atoms, an alkyl group, an arylthio group, or an amido group.

$R^{16}$ is preferably an amino group (include an alkylamino group and an arylamino group), a hydroxyl group, a mercapto group, an alkylthio group, an arylthio group, an alkoxy group, or an aryloxy group, and particularly preferably an amino group.

In the formula (4), $R^{25}$ and $R^{26}$ each independently represent an alkyl group, a halogen atom or an alkoxy group.

The alkyl group represented by $R^{25}$ and $R^{26}$ is each independently an alkyl group having preferably 1 to 8 carbon atoms, more preferably 1 to 6 carbon atoms, furthermore preferably 1 to 4 carbon atoms. Specific examples of the alkyl groups represented by $R^{25}$ and $R^{26}$ include methyl, n-propyl, n-butyl, n-pentyl, n-hexyl, hydroxymethyl, trifluoromethyl, benzyl, carboxyethyl, ethoxycarbonylmethyl, or acethylaminomethyl.

Preferable examples of the halogen groups represented by $R^{25}$ and $R^{26}$ are each independently a fluorine atom or a chlorine atom.

The alkoxy group represented by $R^{25}$ and $R^{26}$ is each independently an alkoxy group having preferably 1 to 8 carbon atoms, more preferably 1 to 6 carbon atoms, furthermore preferably 1 to 4 carbon atoms. Specific examples of the alkoxy groups represented by $R^{25}$ and $R^{26}$ include methoxy, n-propoxy, n-butoxy, n-pentyloxy, n-hexyloxy, trifluoromethoxy, or benzyloxy group.

In the formula (4), $R^{27}$ represents an alkyl group, an acyl group or an alkoxy group.

The alkyl group represented by $R^{27}$ is an alkyl group having preferably 1 to 24 carbon atoms, more preferably 2 to 20 carbon atoms, furthermore preferably 3 to 18 carbon atoms.

The alkyl group represented by $R^{27}$ may be linear, branched, cyclic, or a combination thereof. The cyclic alkyl group is preferably a cyclohexyl group from the viewpoint of having a higher order parameter, and more preferably trans-cyclohexyl from the viewpoint of having a higher order parameter due to higher linearity. A cyclohexyl group having linking points at the first and fourth position is preferable from the viewpoint of improving the order parameter by increasing linearity of the whole molecular structure.

Specific examples of the alkyl group represented by $R^{27}$ includes n-butyl, n-pentyl, n-hexyl, hydroxymethyl, pentylcyclohexylmethyl, 4'-butylbicyclohexyl-4-methyl, ethoxycarbonylmethyl.

The acyl group represented by $R^{27}$ is an acyl group having preferably 2 to 25 carbon atoms, more preferably 3 to 21 carbon atoms, furthermore preferably 4 to 19 carbon atoms.

Specific examples of the acyl group represented by $R^{27}$ include n-butyryl, n-pentanoyl, n-hexanoyl, 4-pentylcyclohexanecarbonyl, 4'-butylbicyclohexyl-4-carbonyl.

The alkoxy group represented by $R^{27}$ is an alkoxy group having preferably 1 to 24 carbon atoms, more preferably 2 to 20 carbon atoms, furthermore preferably 3 to 18 carbon atoms. Specific examples of the alkoxy group represented by $R^{27}$ include n-butoxy, n-pentyloxy, n-hexyloxy, benzyloxy, 4-pentylcyclohexyloxy, 4'-butylbicyclohexyl-4-oxy.

In the formula (4), $R^{28}$ and $R^{29}$ each independently represent an hydrogen atom or a substituent group, and the substituent group V is enumerated as the substituent.

Specific examples of the dichroic dyes which can be used in the present invention will be shown below, but the present invention should not be limited at all by the following specific examples.

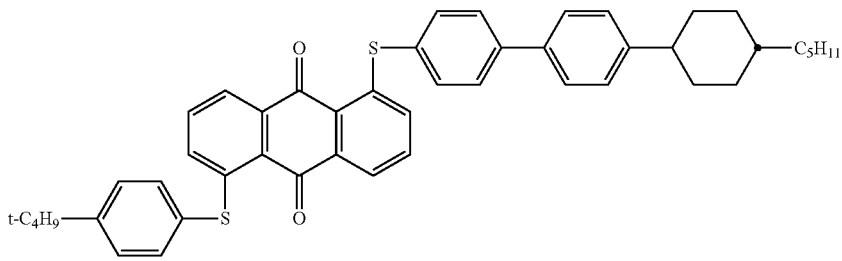

No. 1-1

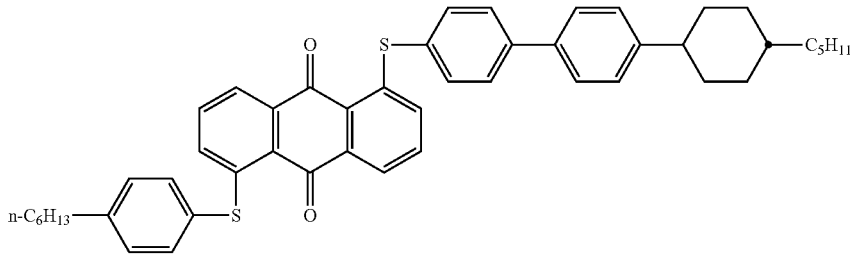

No. 1-2

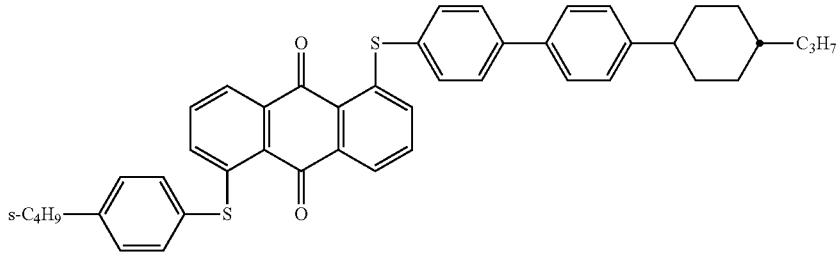

No. 1-3

-continued
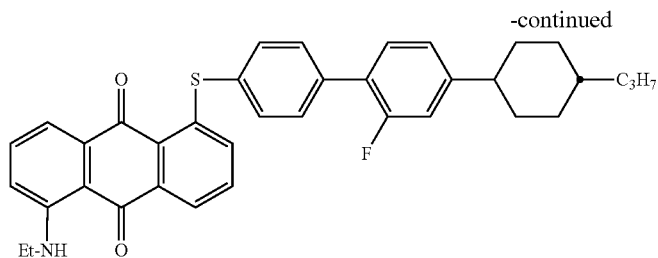
No. 1-5
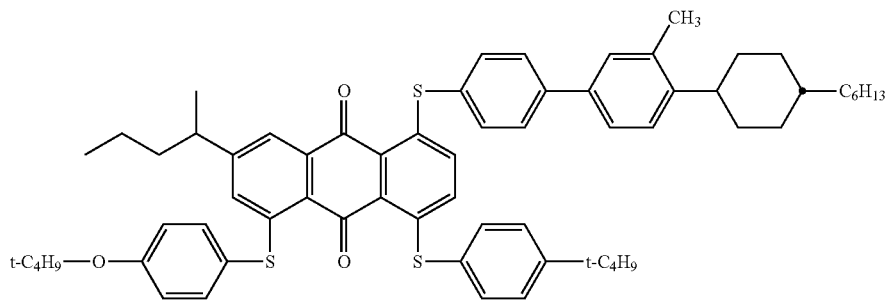
No. 1-6
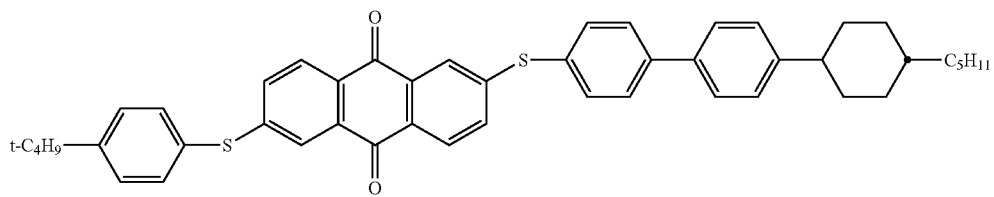
No. 1-7
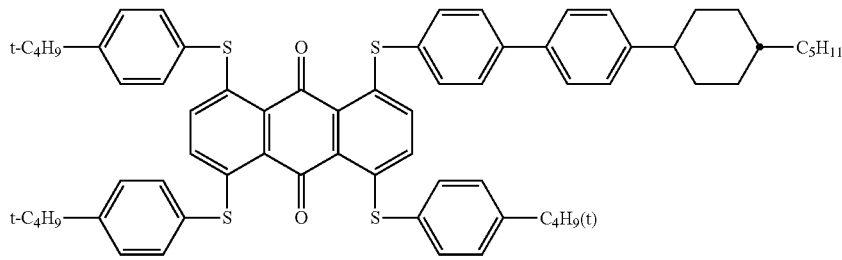
No. 1-8
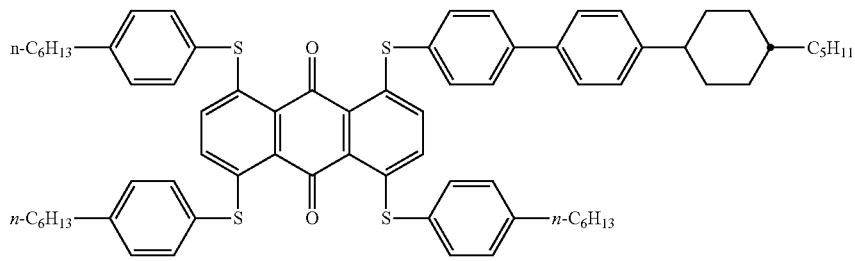
No. 1-9
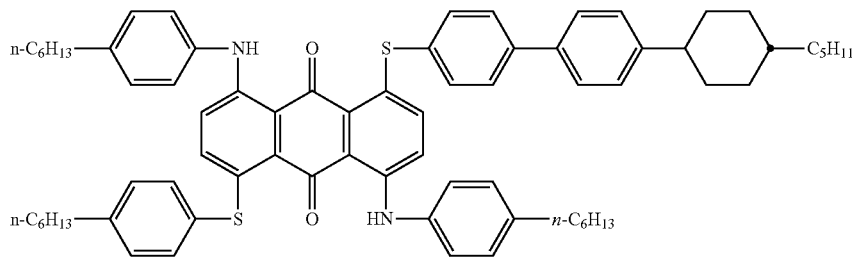

-continued
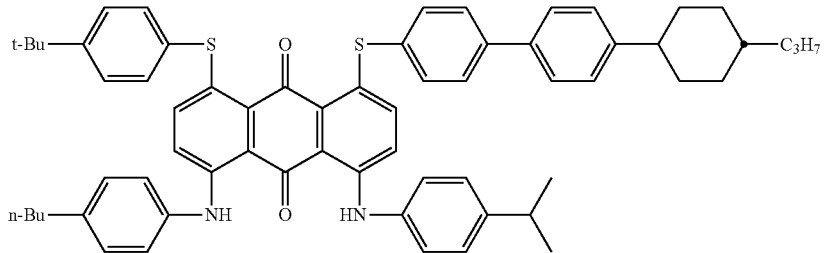
No. 1-10
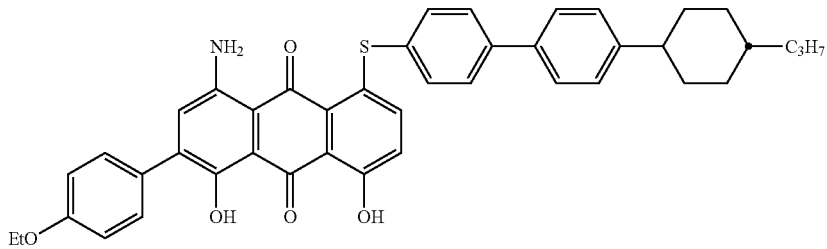
No. 1-11
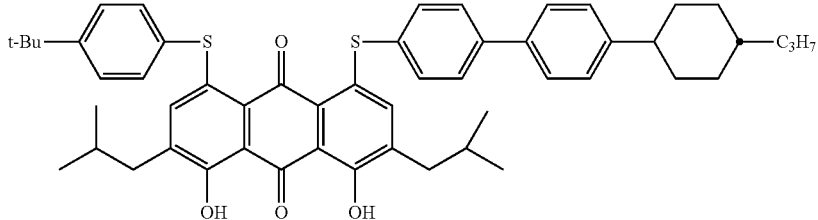
No. 1-12
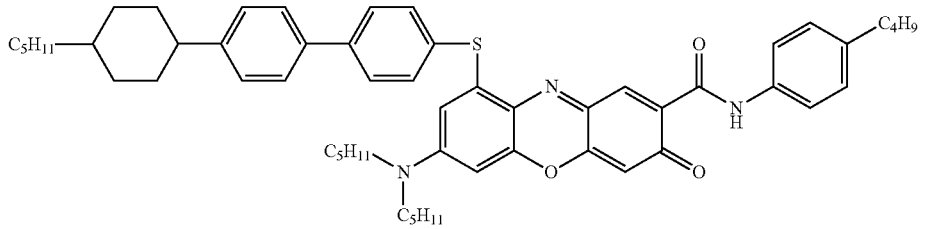
No. 1-13
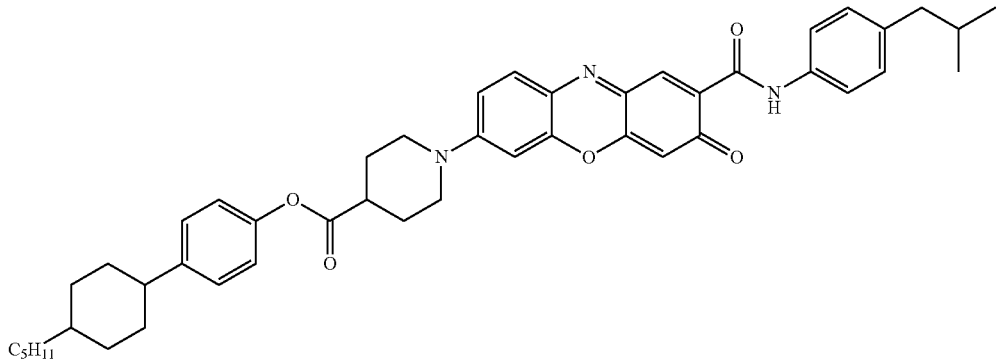
No. 1-14

-continued
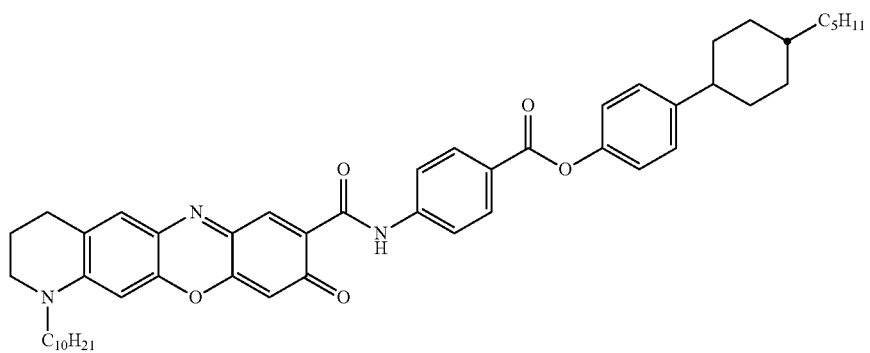
No. 1-15
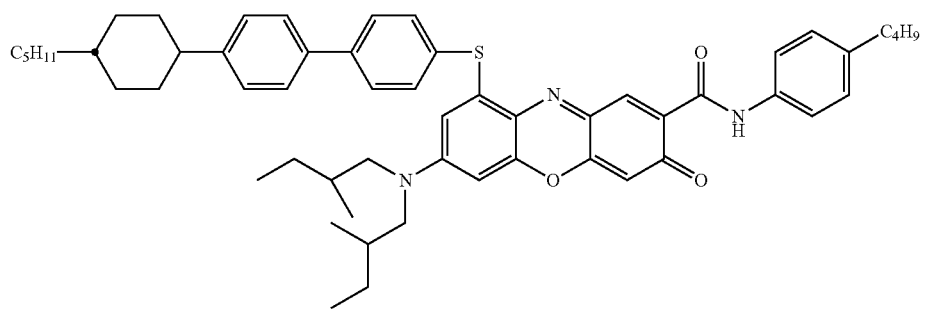
No. 1-16
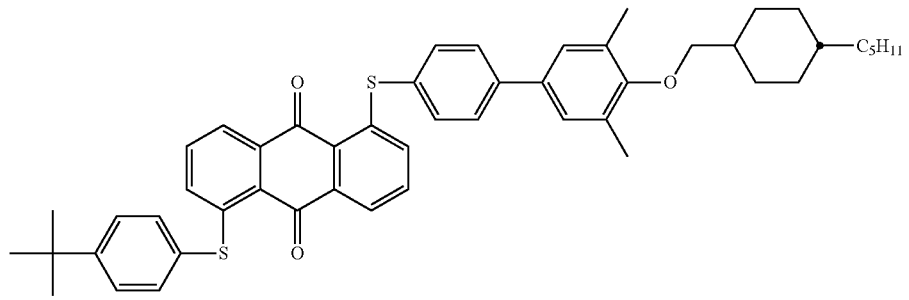
No. 1-17
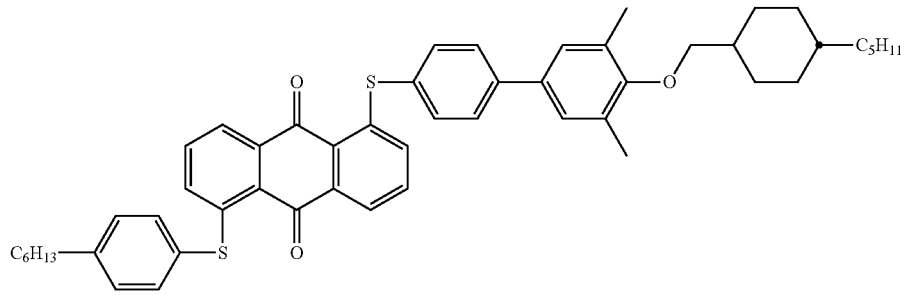
No. 1-18
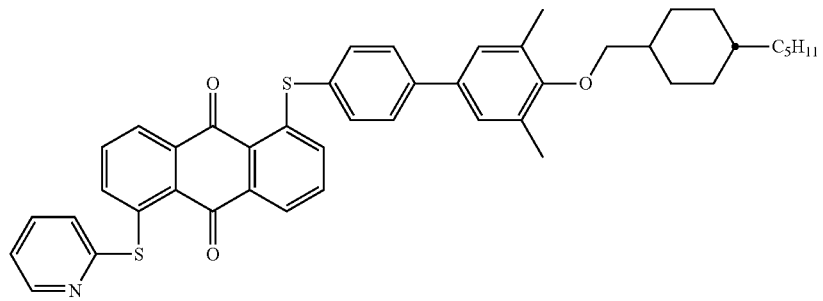
No. 1-19

-continued
No. 1-20
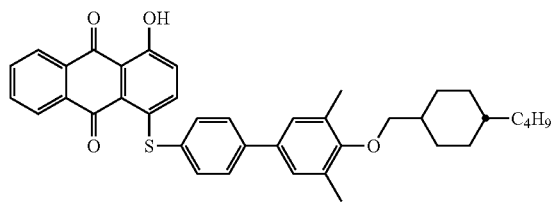
No. 1-21
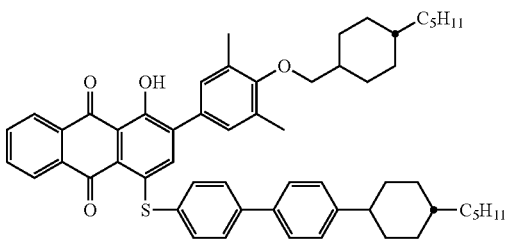
No. 1-22
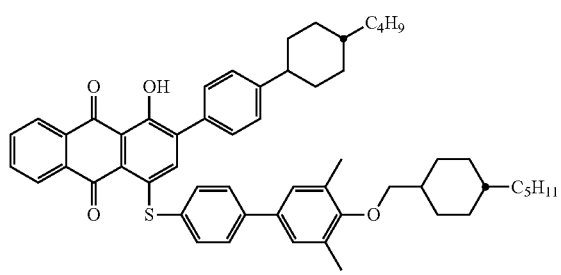
No. 1-23
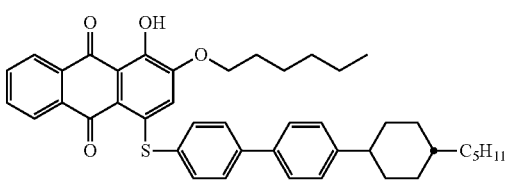
No. 1-24
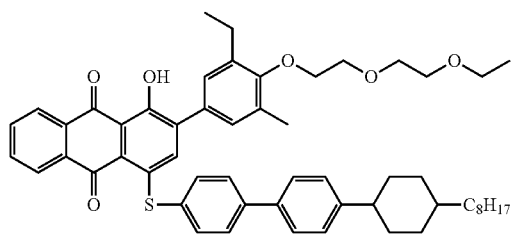
No. 1-25
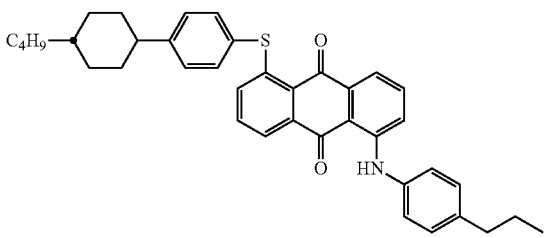
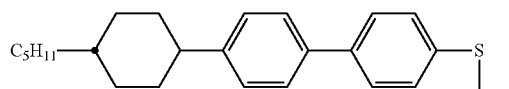
No. 1-26
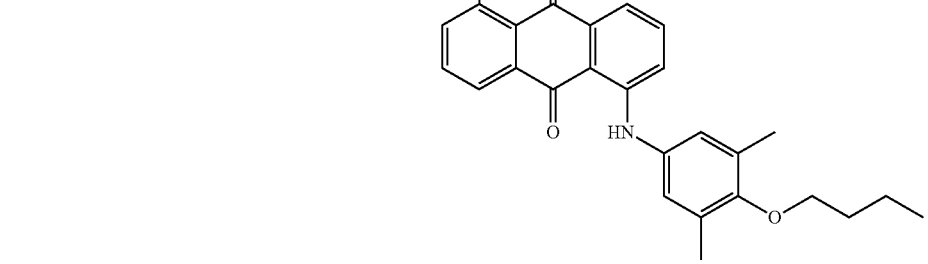
No. 1-27
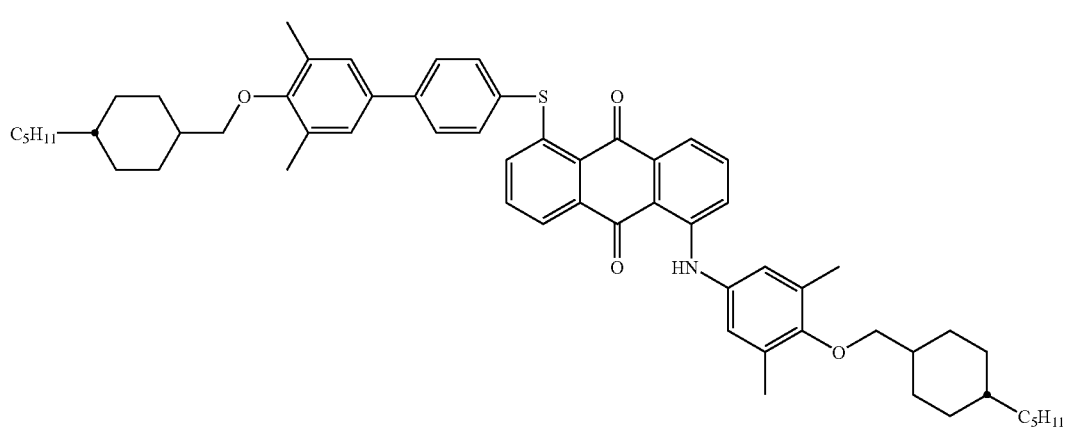

-continued
No. 1-28    No. 1-29
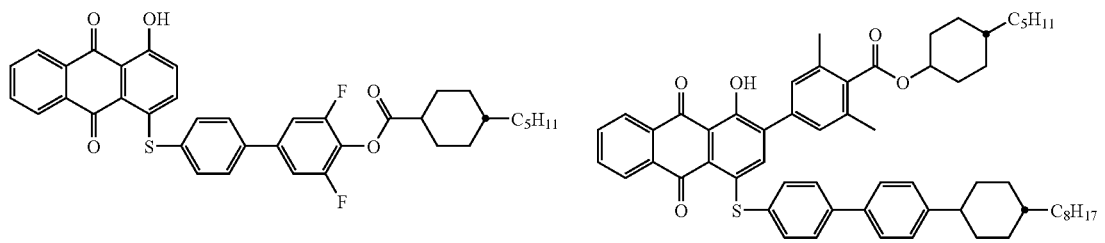
No. 1-30    No. 1-31
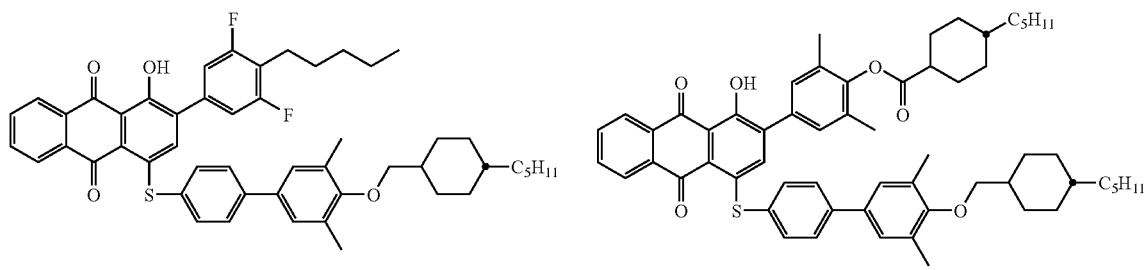
No. 1-32    No. 1-33
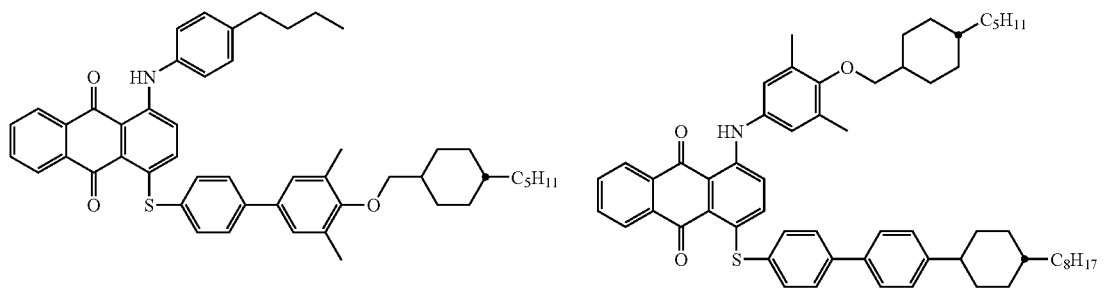
No. 1-34    No. 1-35
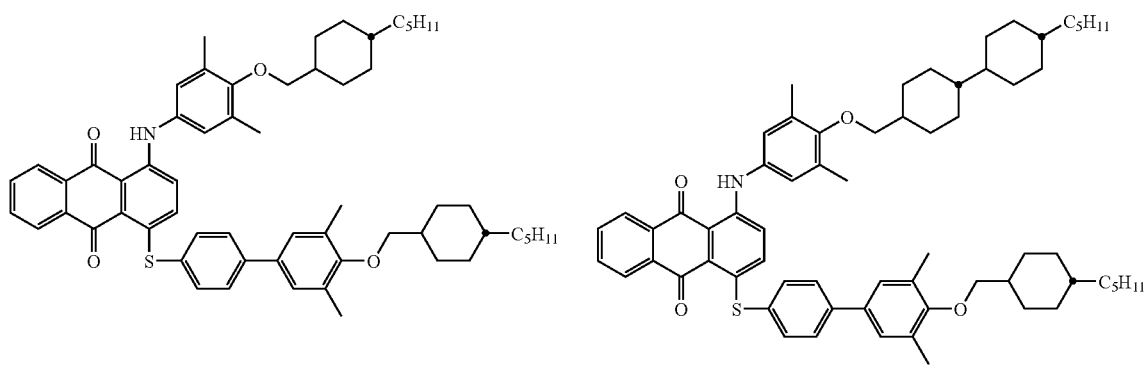

-continued
No. 1-36
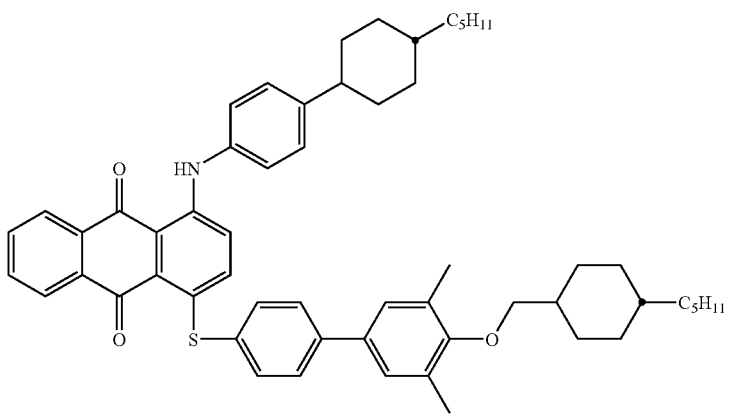
No. 1-37
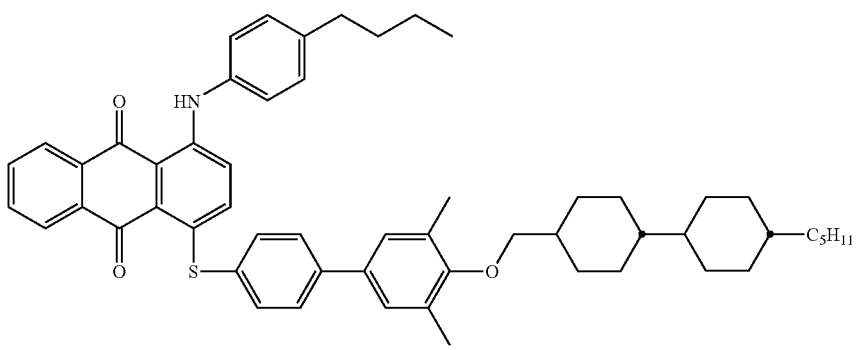
No. 1-38
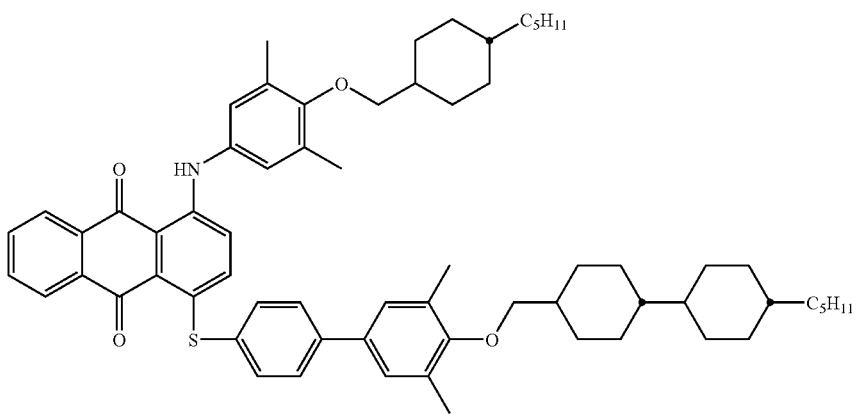
No. 1-39
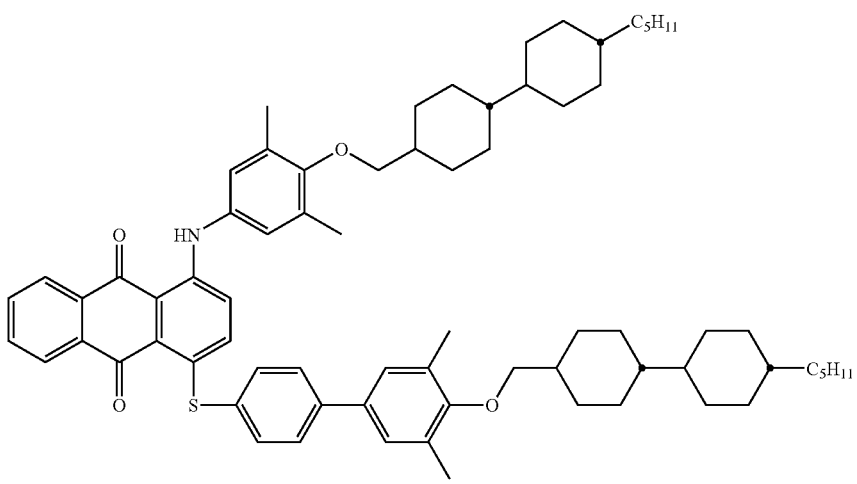

-continued
No. 1-40
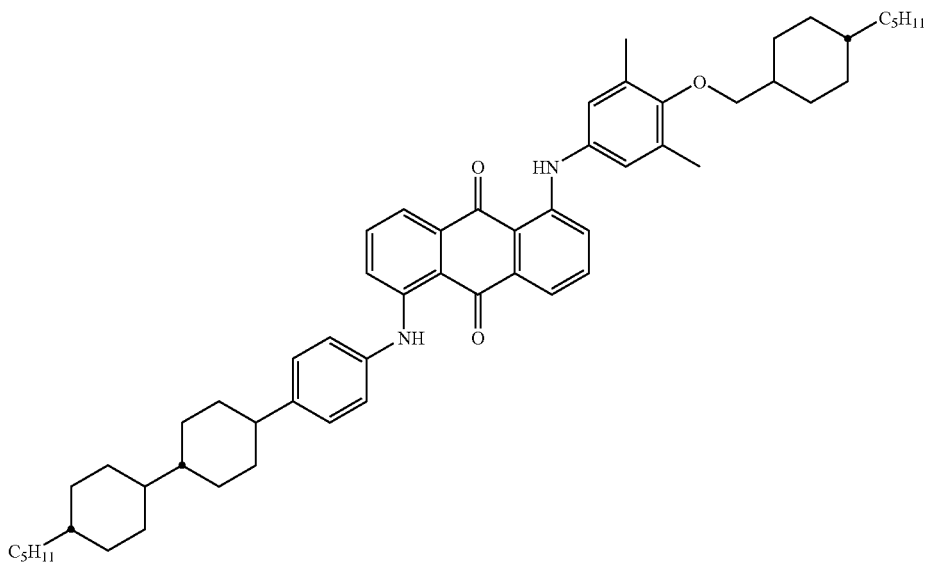
No. 1-41
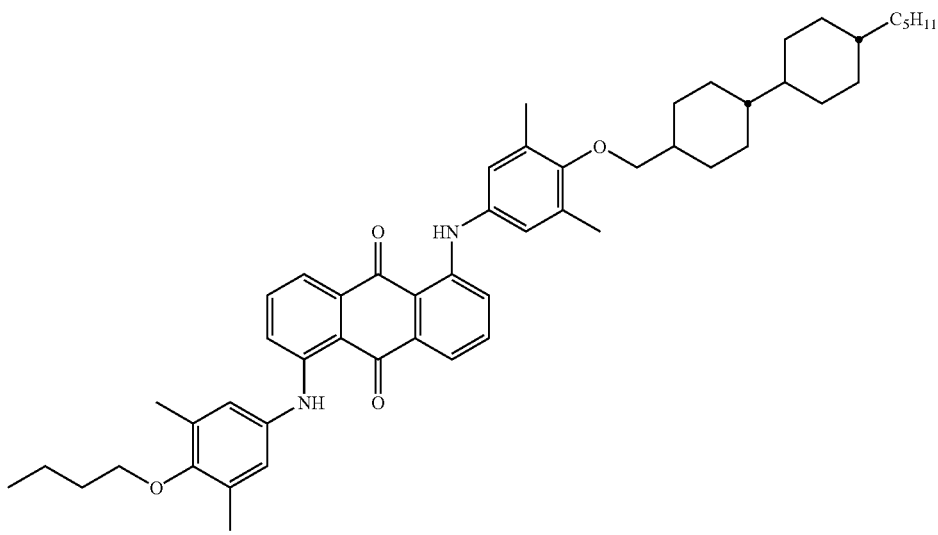
No. 1-42
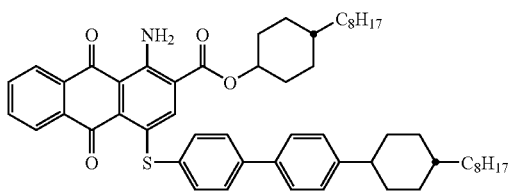
No. 1-43
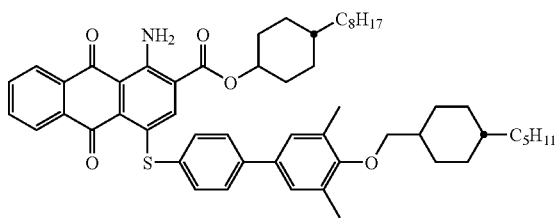
No. 1-44
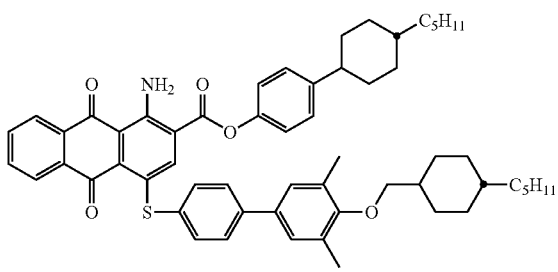
No. 1-45
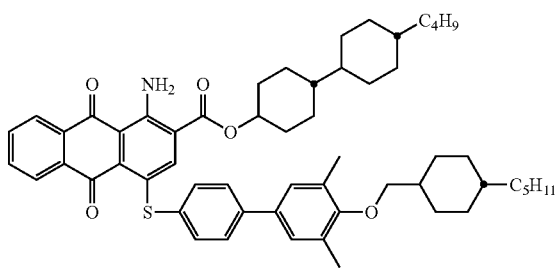

-continued
No. 1-46
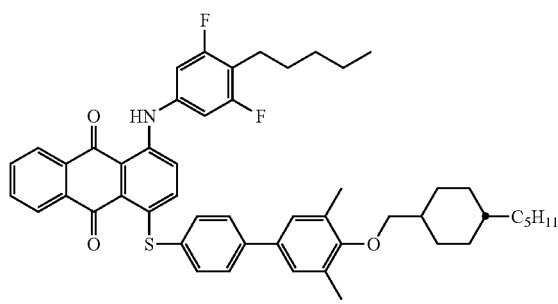
No. 1-47
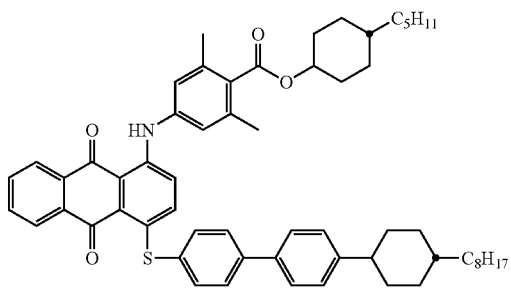
No. 1-48
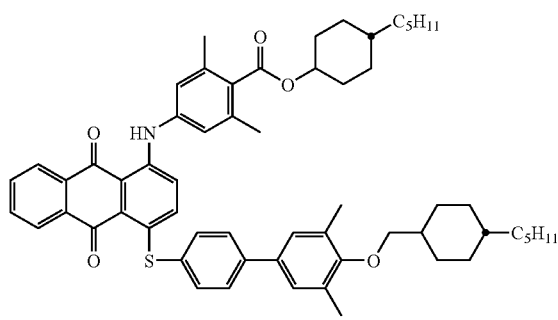
No. 1-49
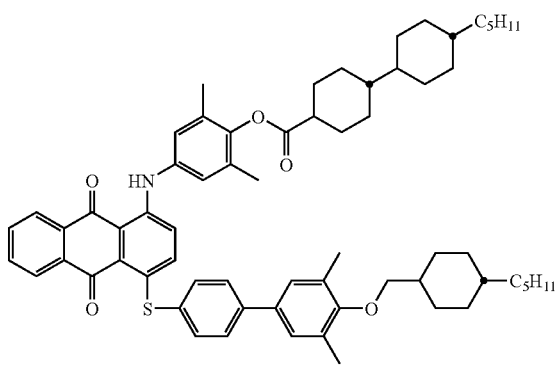
No. 1-50
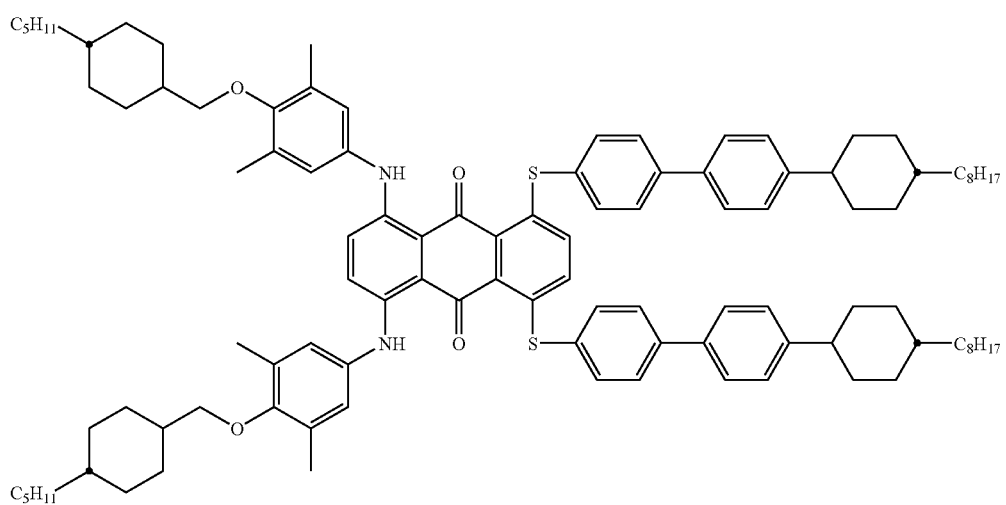

-continued
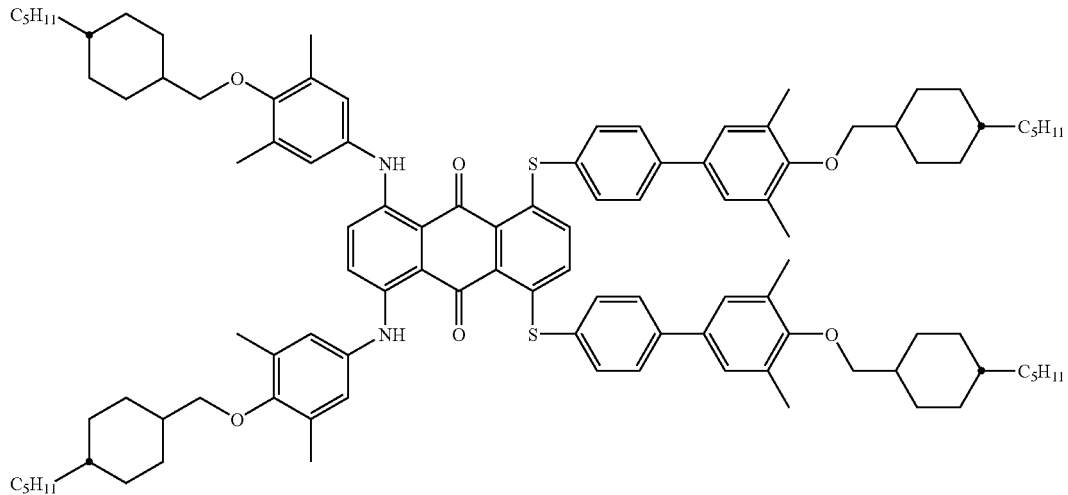
No. 1-51
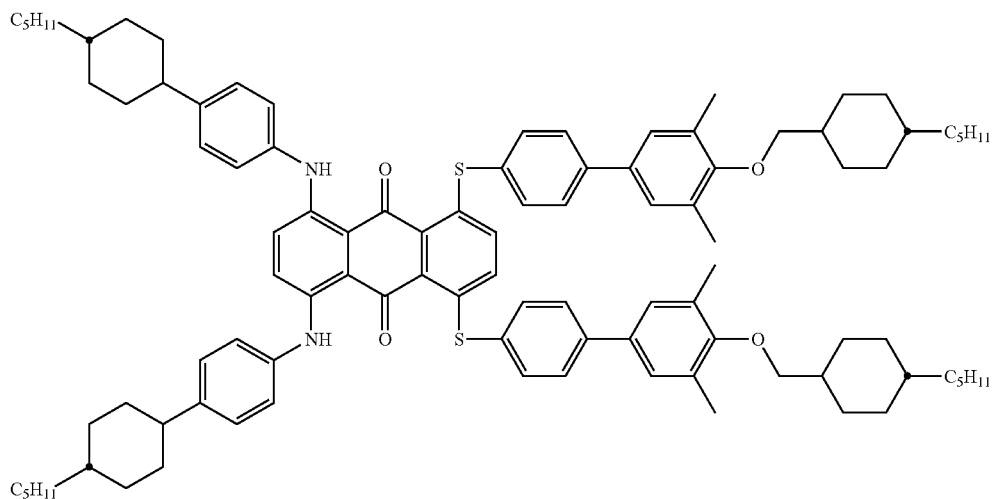
No. 1-52
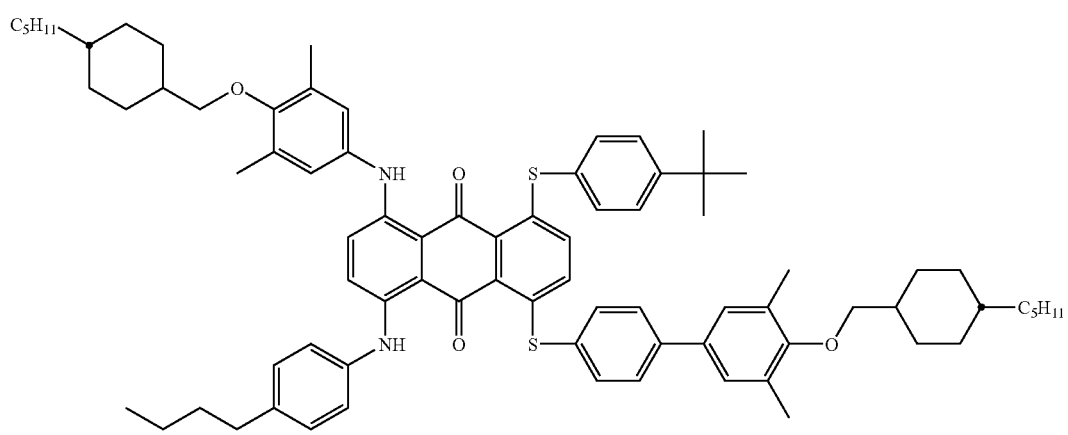
No. 1-53

-continued
No. 1-54
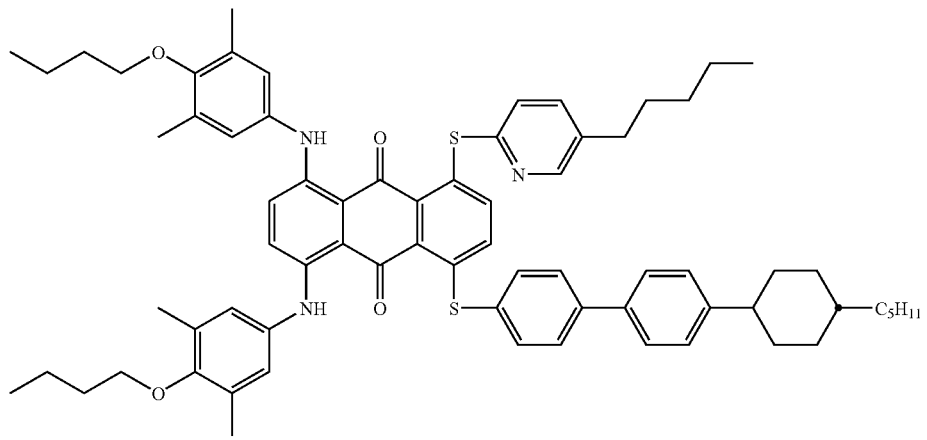
No. 1-55
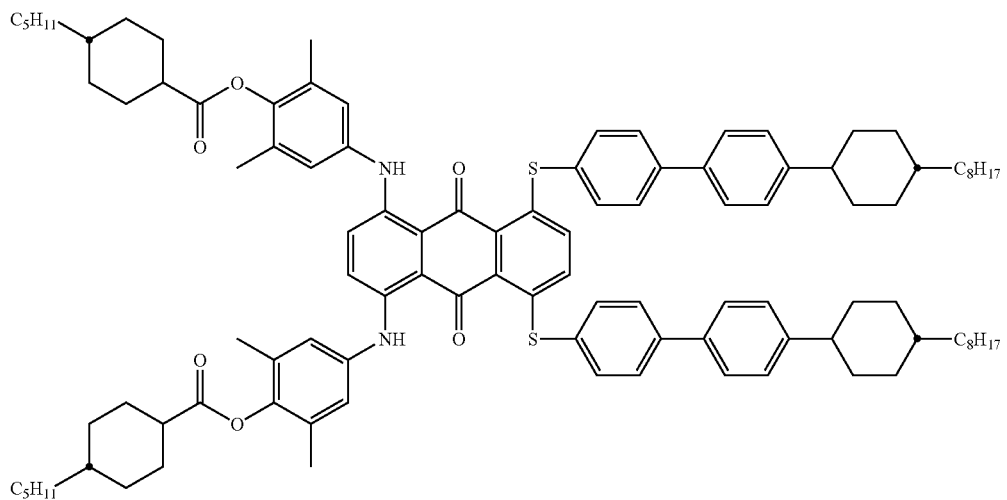
No. 1-56
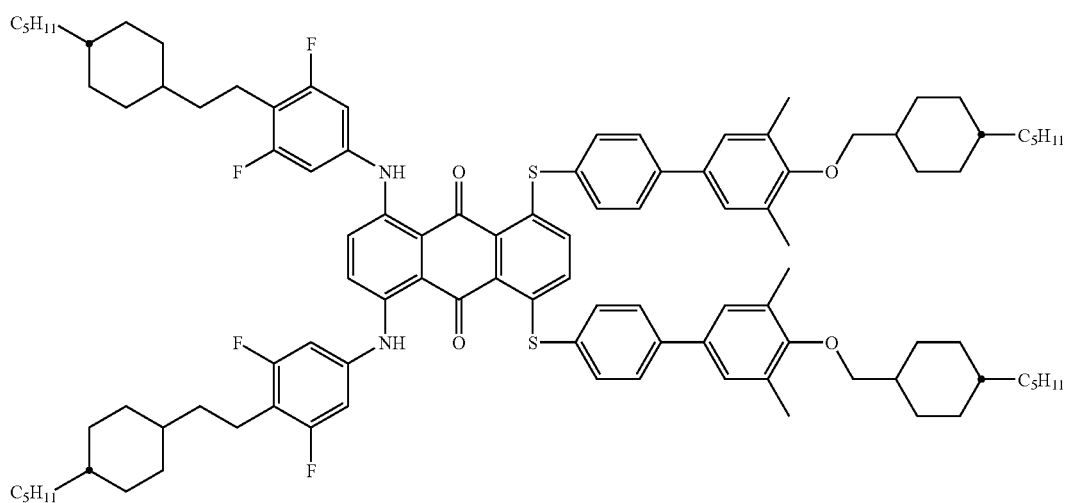

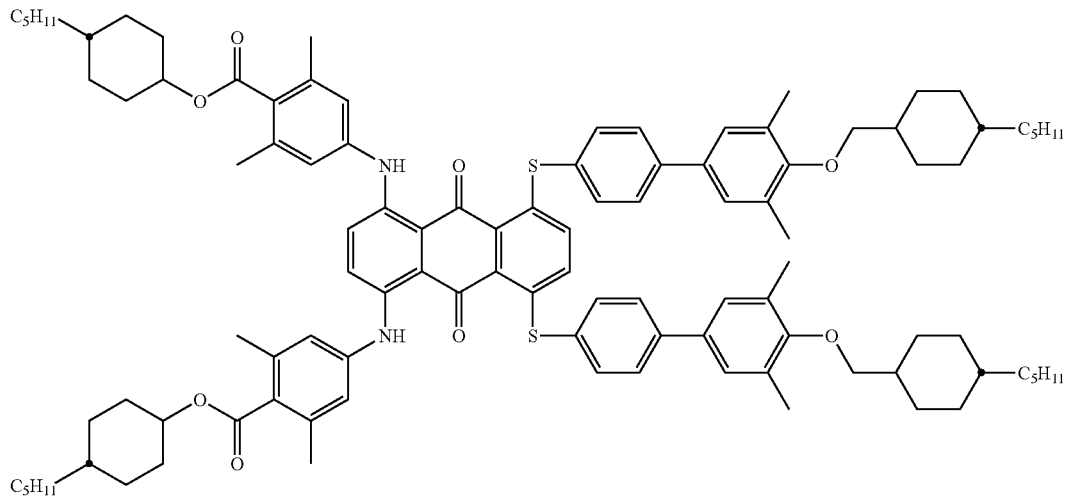

No. 1-57

In the present invention, from the viewpoint of a solubility with respect to a crystal liquid and order parameter, preferable examples of the dichroic dyes includes the specific examples Nos. 1-1 to 1-3, 1-7 to 1-9, 1-17, 1-18, 1-20 to 1-22, 1-26, 1-27, 1-33 to 1-36, 1-38, 1-39, 1-44, 1-45, and 1-47 to 1-52.

Among of them, the dichroic dye is preferably a compound which is an anthraquinone dye and has a structure of the Formula (4), for example, the specific examples Nos. 1-17, 1-18, 1-20 to 1-22, 1-26, 1-27, 1-33 to 1-36, 1-38, 1-39, 1-44, 1-45, and 1-47 to 1-52.

Specific examples of the azo-based dichroic dyes are shown below but the present invention is not restricted to the following specific examples.

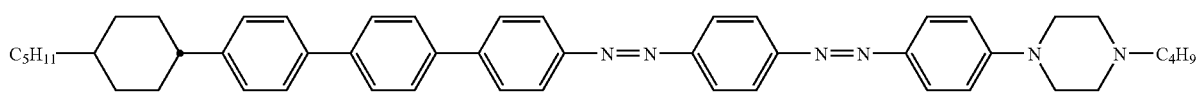

No. 2-1

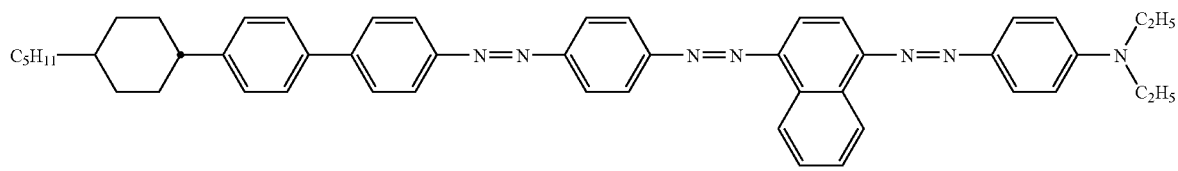

No. 2-2

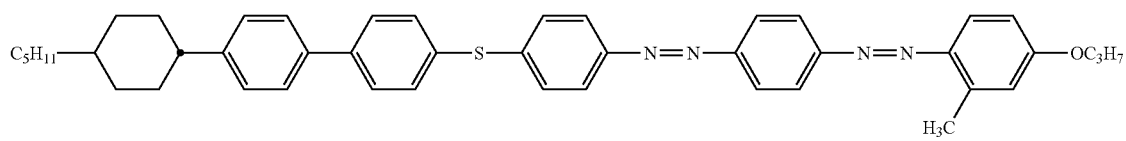

No. 2-3

Specific examples of the dioxadine-based dichroic dyes and merocyanine-based dichroic dyes usable in the present invention are shown below but the present invention is not restricted to the following specific examples.

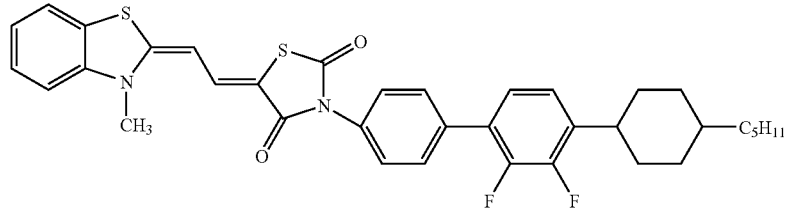

No. 3-1

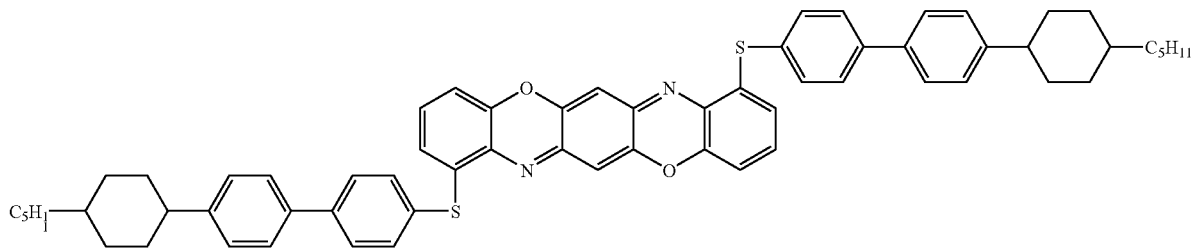

No. 3-2

The dichroic dyes, which have substituents represented by the Formula (1), can be synthesized by combining the known methods. For example, they can be synthesized according to the methods described in JP-A No. 2003-192-664 and the like.

Though the content of the dichroic dye in the liquid crystal composition according to the present invention is not particularly limited, the content of the dichroic acid is preferably from 0.1% to 15% by mass, more preferably from 0.5% to 10% by mass, and further preferably from 1% to 8% by mass relative to the content of the host liquid crystal.

As to the contents of the host liquid crystal and the dichroic dye, it is desirable to prepare a liquid crystal composition containing the both, measure an absorption spectrum of each of liquid crystal cells enclosing the liquid crystal composition therein and determine a dye concentration necessary for exhibiting a desired optical density as the liquid crystal cell.

(Other Additives)

For the purpose of changing physical properties of the host liquid crystal to desired ranges (for example, for the purpose of making the temperature range of a liquid crystal phase fall within a desired range), a compound which is not liquid crystalline may be added in the liquid crystal composition according to the present invention. Also, the liquid crystal composition according to the present invention may contain compounds such as an ultraviolet ray absorber and an antioxidant.

(Physical Properties of Liquid Crystal Composition)

In the liquid crystal composition according to the present invention, the chiral pitch length (P) must be satisfied with the above-described Expression (1) relative to the gap (G) between the pair of electrodes. That is, from the viewpoint of a balance between a reduction of driving voltage and a reduction of transmittance at the time of coloration, a ratio (P/G) of the chiral pitch length (P) of the liquid crystal composition to the gap (G) between the pair of electrodes is from 0.06 to less than 1.0, and preferably from 0.1 to 0.7.

The adjustment of the chiral pitch length is in general carried out in the following manner.

(1) First of all, a liquid crystal compound is selected, from the viewpoints of dielectric anisotropy ($\Delta\epsilon$), refractive index anisotropy ($\Delta n$), viscosity, solubility of a dye and the like.

(2) Next, an HTP value of the chiral reagent is measured.

(3) Then, the addition amount of the chiral reagent is determined from the obtained HTP value so as to attain a desired chiral pitch length.

Specifically, from the viewpoint of attaining a high contrast, the chiral pitch length (P) is preferably from 1 μm to 5 μm, and more preferably from 1 μm to 3 μm.

<Configuration of Transmissive Liquid Crystal Device>

The liquid crystal device of the present invention has a liquid crystal layer including the above-described liquid crystal composition between a pair of electrodes provided with the above-described vertical alignment film. An embodiment of the transmissive liquid crystal device of the present invention is shown in FIG. 6.

In the transmissive liquid crystal device 20 of the present embodiment, a pair of supports 15, in which a transparent electrode 12 is provided on a substrate 10 and a vertical alignment film 14 is further provided thereon, are disposed via a space formed by spacers 16 or the like. The liquid crystal composition 18 is enclosed in this space, thereby fabricating a liquid crystal device 20. It is preferable that an injection portion of liquid crystal of the liquid crystal device 20 is sealed with a sealing agent 22.

Figure 6:
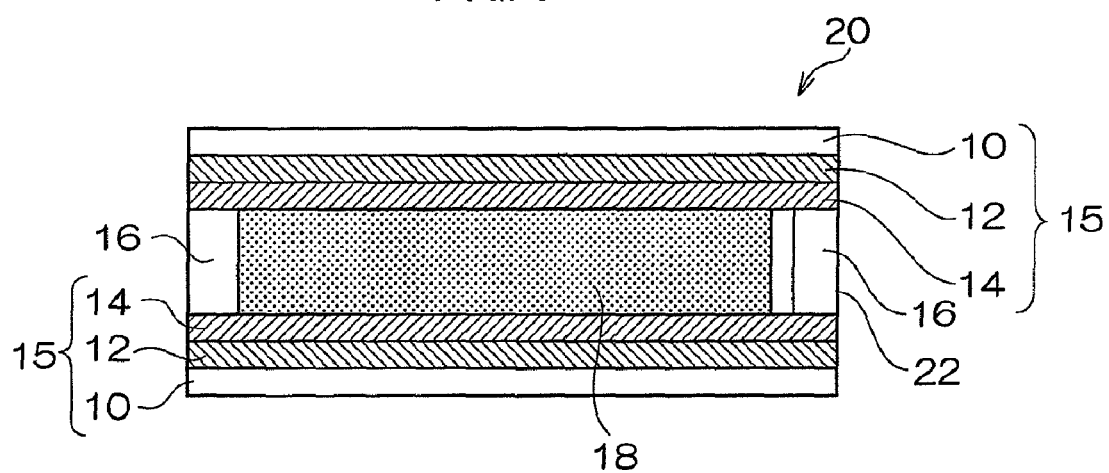
FIG. 6 is a schematic view showing an embodiment of a transmissive liquid crystal device of the present invention.

In the present invention, in addition to the configuration members as shown in FIG. 6, other members and materials as described later can be properly applied.

(Electrode 12)

As the electrode, gold, silver, copper, aluminum or the like is favorably used. The transparent electrode can be formed of, for example, indium oxide, ITO (indium-tin-oxide), tin oxide, a transparent conductive polymer (for example, PEDOT/PSS, manufactured by Nagase Chemitex Corporation, H. C. Stark, Ltd., etc.) or a carbon nanotube; and when applied to members with many curved surfaces, from the viewpoint of stability against bending or strain, it is preferable that the transparent electrode is configured of a conductive polymer or a carbon nanotube.

As to the transparent electrode, for example, those described on pages 232 to 239 of *Liquid Crystal Handbook* (edited by the 142nd Committee in Japan Society for the Promotion of Science, The Nikkan Kogyo Shimbun, Ltd., 1989) are useful.

(Spacer 16)

The gap (G) between the pair of electrodes can be, for example, formed by facing the supports 15 each other via the spacers 16 or the like. The liquid crystal composition 18 is disposed in the space formed between the pair of electrodes 12. The liquid crystal layer can be disposed in the space between the substrates 10 by coating or printing the liquid crystal composition 18 on the substrate 10.

As to the spacer, for example, those described on pages 257 to 262 of *Liquid Crystal Handbook* (edited by the 142nd Committee in Japan Society for the Promotion of Science, The Nikkan Kogyo Shimbun, Ltd., 1989) are useful.

In case of the liquid crystal device of the present invention, the thickness of the liquid crystal layer, namely the gap between the substrates as formed by the spacers is preferably from 1 µm to 100 µm, and more preferably from 5 µm to 20 µm. When the thickness of the liquid crystal layer is thicker than 100 µm, the transmittance in a transparent state is easily lowered, whereas when it is thinner than 2 µm, display unevenness is easily generated due to a partial defect.

(Substrate 10)

The liquid crystal device of the present invention has the substrate 10. Though the substrate 10 is not particularly limited, a metal, glass, a plastic, paper or a ceramic is favorably useful. Examples of a plastic substrate which is used in the present invention include triacetyl cellulose (TAC), polyethylene terephthalate (PET), polyethylene naphthalate (PEN), syndiotactic polystyrene (SPS), polyphenylene sulfide (PPS), polycarbonate (PC), polyarylate (PAr), polysulfone (PSF), polyestersulfone (PES), polyetherimide (PEI), cyclic polyolefins or polyimide (PI). Of these, polyethylene terephthalate (PET) is preferable.

As the resin, those having a heat expansion coefficient of not more than 30 ppm/° C. are preferable. The heat expansion coefficient as referred to herein was measured by T8310 (THERMO PLUS Series, manufactured by Rigaku Denki Corporation). Examples thereof include PET (LUMILAR, manufactured by Toray Industries, Inc.; 15 ppm/° C.), PEN (Q65A, manufactured by DuPont Teijin; 20 ppm/° C.), PI (UPILEX, manufactured by Ube Industries, Ltd.; 20 ppm/° C.) and aramid resins (manufactured by Teijin Limited; 2 ppm/° C.).

The heat expansion coefficient of not more than 30 ppm may also be obtained by adding an inorganic material (for example, a sol-gel method, glass cloth, glass fiber) to a resin having a glass transition point (Tg) of 150° C. or higher as enumerated below.

Preferred examples (the numerical figure in each of the parentheses indicates Tg) thereof include a polycarbonate resin (PC: 140° C.), an alicyclic polyolefin resin (for example, ZEONOR 1600 manufactured by Zeon Corporation: 160° C., ARTON manufactured by JSR Corporation: 170° C.), a polyarylate resin (PAr: 210° C.), a polyethersulfone resin (PES: 220° C.), a polysulfone resin (PSF: 190° C.), a polyester resin (for example, O-PET, manufactured by Kanebo, Ltd.: 125° C., polyethylene terephthalate, polyethylene naphthalate), a cycloolefin copolymer (COC, the compound of Example 1 of JP-A No. 2001-150584: 162° C.), a fluorene ring-modified polycarbonate resin (BCF-PC, the compound of Example 4 of JP-A No. 2000-227603: 225° C.), an alicyclic-modified polycarbonate resin (IP-PC, the compound of Example 5 of JP-A No. 2000-227603: 205° C.) and an acryloyl compound (the compound of Example 1 of JP-A-2002-80616: 300° C. or higher).

As the polymer substrate which is used in the present invention, from the viewpoints of solvent resistance, heat resistance and the like, a crosslinked resin can also be preferably used. As to the kind of the crosslinked resin, any of various known thermosetting resins and radiation-curable resins can be used without particular limitations. Examples of thermosetting resins include a phenol resin, a urea resin, a melamine resin, an unsaturated polyester resin, an epoxy resin, a silicone resin, a diallyl phthalate resin, a furan resin, a bismaleimide resin and a cyanate resin. Besides, the crosslinking method is not particularly limited so far as it is concerned with a reaction capable of forming a covalent bond, and a system in which a reaction for forming a urethane bond using a polyalcohol compound and a polyisocyanate compound proceeds at room temperature can also be employed without particular limitations. However, in such a system, a pot life before the fabrication is frequently of a problem. Thus, the system is usually employed as a two-pack mixture type in which a polyisocyanate compound is added immediately before the fabrication. On the other hand, in the case where the system is employed as a one-pack type, it is effective to protect a functional group capable of participating in the crosslinking reaction, and a block type curing agent is also commercially available. As the commercially available block type curing agent, B-882N, manufactured by Mitsui Takeda Chemicals Inc. and COLONATE 2513, manufactured by Nippon Polyurethane Industry Co., Ltd. (all of which are a block polyisocyanate), CYMEL 303, manufactured by Mitsui Cytec Ltd. (which is a methylated melamine resin) and the like are known.

(Protective Layer)

The support 15 may have a protective layer (not illustrated). Examples of polymers which are used for the protective layer include a water-soluble polymer, a cellulose acylate, a latex polymer and a water-soluble polyester. Examples of the water-soluble polymer include gelatin, gelatin derivatives, casein, agar-agar, sodium alginate, starch, polyvinyl alcohol, polyacrylic acid copolymers and maleic anhydride copolymers; and examples of the cellulose acylate include carboxymethyl cellulose and hydroxyethyl cellulose. Examples of the latex polymer include vinyl chloride-containing copolymers, vinylidene chloride-containing copolymers, acrylic ester-containing copolymers, vinyl acetate-containing copolymers and butadiene-containing copolymers.

The protective layer can contain an inorganic or organic fine particle as a matting agent so far as the transparency of a film substrate with barrier properties is not substantially hindered. As the inorganic fine particle matting agent, silica ($SiO_2$), titanium dioxide ($TiO_2$), calcium carbonate, magnesium carbonate or the like can be used. As the organic fine particle matting agent, polymethyl methacrylate, cellulose acetate propionate, polystyrene, treatment liquid-soluble polymers described in U.S. Pat. No. 4,142,894, polymers described in U.S. Pat. No. 4,396,706 or the like can be used.

The average particle size of such a fine particle matting agent is preferably from 0.01 µm to 10 µm, and more preferably from 0.05 µm to 5 µm. Its content is preferably from 0.5 mg/m$^2$ to 600 mg/m$^2$, and more preferably from 1 mg/m$^2$ to 400 mg/m$^2$.

The protective layer can be coated by a generally well known coating method, for example, a dip coating method, an air knife coating method, a curtain coating method, a roll coating method, a wire bar coating method, a gravure coating method, a slide coating method, or an extrusion coating method using a hopper described in U.S. Pat. No. 2,681,294.

(Barrier Layer)

In order to suppress the deterioration of the member to be caused due to the penetration with water or oxygen, the support 15 may have a barrier layer (not illustrated).

The barrier layer may be formed of any of an organic polymer system, an inorganic system or a composite system thereof. Examples of the organic polymer system include ethylene-vinyl alcohol (EVOH), polyvinyl alcohol (PVA/PVOH), nylon MXD6 (N-MXD) and nano composite system nylon. Examples of the inorganic system include silica, alumina and binary systems. Details thereof are described in, for example, *Development of High Barrier Material, and Mea-*

*suring and Evaluating Method of Film Forming Technology and Barrier Performance* (Society of Engineering Information, 2004).

In the case where the substrate 10 is a plastic film, it is preferable that a stack obtained by alternately stacking an inorganic layer and an organic layer is applied for the barrier layer. Such a barrier layer is able to effectively prevent the penetration of moisture and oxygen and hardly peels away even under a high-temperature and high-humidity condition due to the organic layer.

The barrier layer composed of a stack preferably includes a structure in which an inorganic layer and an organic layer are alternately stacked from the side of the plastic film, and at least a first inorganic layer, an organic layer (first organic layer) and a second inorganic layer are stacked in this order from the side of the plastic film. On the second inorganic layer, at least one layer may be stacked in procedures of stacking a second organic layer, a third inorganic layer, a third organic layer, a fourth inorganic layer, a fourth organic layer, a fifth inorganic layer and so on. The uppermost layer of the alternate stack may be an inorganic layer or an organic layer.

When an inorganic layer is provided on the side of the plastic film, the penetration of water and oxygen can be effectively prevented; and an alternate stack of an inorganic layer and an organic layer from the side of the plastic film is effective because the subject effect is more accumulated.

The barrier layer is provided on the surface of the support on the side where the structural color layer is not sandwiched. Though the barrier layer may be provided one or both of the pair of supports, it is preferable that the barrier layer is provided on the both supports.

(Antistatic Layer)

The support 15 may have an antistatic layer (conductive layer) (not illustrated). It is preferable that the antistatic layer is formed on the back surface (surface on which the inorganic/organic alternate stack is not formed) of the substrate 10. Specifically, the antistatic layer is formed by providing a layer containing an ion conductive substance or a conductive fine particle.

The ion conductive substance as referred to herein is a substance exhibiting electric conductivity and containing an ion which is a carrier for carrying electricity, and examples thereof include ionic polymer compounds. Examples of ionic polymer compounds include anionic polymer compounds described in JP-B Nos. 49-23828, 49-23827 and 47-28937; ionene type polymers having a dissociative group in a main chain thereof described in JP-B No. 55-734, JP-A No. 50-54672 and JP-B Nos. 59-14735, 57-18175, 57-18176 and 57-56059; and cationic pendant type polymers having a cationic dissociative group in a side chain thereof described in JP-B Nos. 53-13223, 57-15376, 53-45231, 55-145783, 55-65950, 55-67746, 57-11342, 57-19735, 58-56858, 61-27853 and 62-9346.

As metal oxides which are a conductive fine particle, ZnO, $TiO_2$, $SnO_2$, $Al_2O_3$, $In_2O_3$, $SiO_2$, MgO, BaO, $MoO_2$, $V_2O_5$ and the like, or composite oxides thereof are preferable, with ZnO, $TiO_2$ and $SnO_2$ being especially preferred. As to examples of metal oxides containing a dissimilar atom, the addition of Al, In or the like for ZnO, the addition of Nb, Ta or the like for $TiO_2$, or the addition of Sb, Nb, a halogen element or the like for $SnO_2$ is effective. The addition amount of such a dissimilar atom is preferably in the range of from 0.01% to 25% by mole, and especially preferably in the range of from 0.1% to 15% by mole.

(Other Members)

The liquid crystal device of the present invention may be provided with an ultraviolet absorbing layer, an antireflective layer, a hard coat layer, an anti-fouling layer, an organic interlayer insulating film, a retardation plate, a flattening layer, an adhesion improving layer or the like as the need arises. These may be used singly or in combination of two or more kinds thereof.

The ultraviolet absorbing layer preferably contains an antioxidant such as 2,2-thiobis(4-methyl-6-t-butylphenol), 2,6-di-t-butylphenol or the like; and an ultraviolet ray absorber such as 2-(3-t-butyl-5-methyl-2-hydroxyphenyl)-5-chlorobenzotriazole, an alkoxybenzophenone or the like.

The antireflective film is formed of an inorganic or organic material; and its film configuration may be a single-layered or multilayered configuration. Furthermore, the antireflective film may be of a multilayered structure composed of an inorganic material film and an organic material film. The antireflective film can be provided on one surface side or on the both surfaces. In the case where the antireflective film is provided on the both surfaces, the antireflective films on the both surfaces may have the same configuration or a different configuration.

Examples of inorganic materials which are used in the antireflective film include $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$ or $WO_3$. These materials can be used singly or in combination of two or more kinds thereof. Of these, $SiO_2$, $ZrO_2$, $TiO_2$ or $Ta_2O_5$, each of which can be subjected to vacuum vapor deposition at low temperatures, are preferable.

As a multilayered film formed of an inorganic material, a stack structure formed by alternate fabrication of a high refractive index material layer and a low refractive index material layer in such a manner that the total optical film thickness of a $ZrO_2$ layer and an $SiO_2$ layer is $\lambda/4$, the optical film thickness of the $ZrO_2$ layer is $\lambda/4$, and the optical film thickness of the $SiO_2$ layer as the most superficial layer is $\lambda/4$ in this order from the support side is exemplified. Here, $\lambda$ represents a design wavelength, and 520 nm is usually employed. The most superficial layer is preferably composed of $SiO_2$ because it has a low refractive index and is able to impart mechanical strength to the antireflective film.

In the case where the antireflective film is formed of an inorganic material, examples of the fabrication method which can be employed include a vacuum vapor deposition method, an ion plating method, a sputtering method, a CVD method and a method for achieving deposition by a chemical reaction in a saturated solution.

Examples of organic materials which are used in the antireflective film include FFP (tetrafluoroethylene-hexafluoropropylene copolymer), PTFE (polytetrafluoroethylene) and ETFE (ethylene-tetrafluoroethylene copolymer). These materials can be chosen while taking into consideration the refractive index of a supports material or a hard coat film (if any). As to the fabrication method, in addition to the vacuum vapor deposition method, the fabrication can be achieved by a coating method with excellent mass productivity, for example, a spin coating method, a dip coating method.

As to the hard coat layer, known ultraviolet ray curable or electron beam curable acrylic or epoxy based resins can be used.

As to the antifouling film, water-repellent and oil-repellent materials, for example, fluorine-containing organic polymers can be used.

As to the light modulation performance in the liquid crystal device of the present invention, a ratio ($T_0/T$) of a light transmittance ($T_0$) in a transparent state to a light transmittance (T) in a colored state is preferably in the range of from 3 to 1,000, more preferably in the range of from 5 to 1,000, and especially preferably in the range of from 8 to 1,000.

<Configuration of Reflective Liquid Crystal Device>

Figure 7:
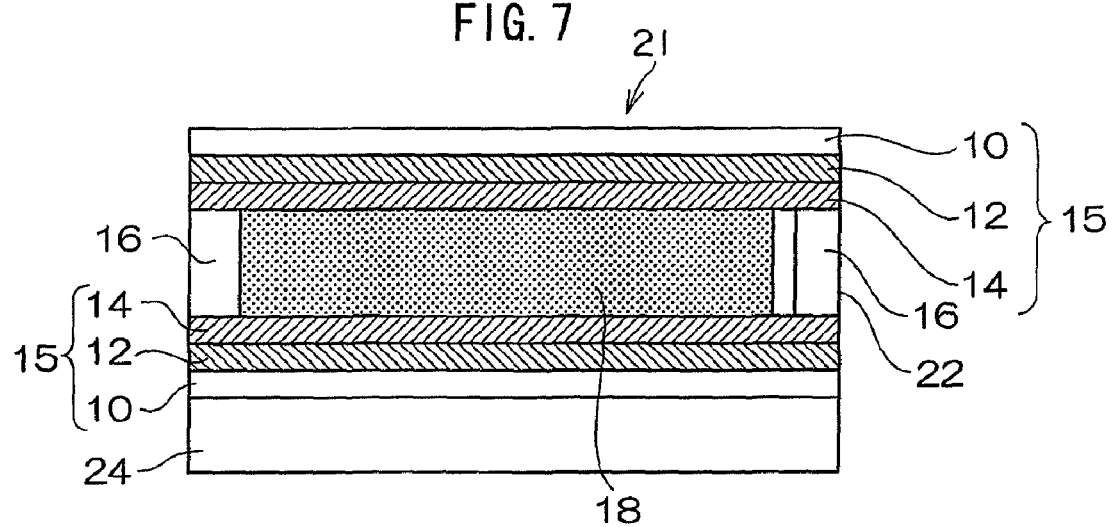
FIG. 7 is a schematic view showing an embodiment of a reflective liquid crystal device of the present invention.

The liquid crystal device of the present invention may be a reflective liquid crystal device which is provided a reflective layer on one of a pair of substrate 10. An embodiment of the reflective liquid crystal device of the present invention is shown in FIG. 7.

In the reflective liquid crystal device 21 of the present embodiment, a reflective layer 24 is provided on a opposite surface with regard to a transparent electrode 12 of one of a pair of substrate 10. The thickness of the reflective layer is preferably from 10 µm to 500 µm, and more preferably from 50 µm to 200 µm.

A resin for forming a reflective layer 24 may be used known resins, for example, a methacryl resin such as an acrylic resin and a polymethyl methacrylate, a polystyrene, a polyester, polyethylene, a polypropylene, a polycarbonate, a polyacrylonitrile, a polyethylene oxide, a polyvinyl pyrrolidone, a polysulfone, a polydimethyl siloxane, a polyvinyl alcohol, a gelatin, a cellulose, a copolymer thereof or a mixture thereof. Preferable resins is a mixture of a methacryl resin such as an acrylic resin or a polymethyl methacrylate and a polyvinyl pyrrolidone or a cyanoethylated cellulose (manufactured by Shin-Etsu Chemical Co., Ltd.), from the viewpoint of a transparency of the resin and a dispersibility of titanium dioxide thereto.

The reflective layer 24 is preferably formed by resin dispersed a white pigment. Examples of the white pigment include a inorganic pigment such as a silica dioxide, a titanium dioxide, a barium sulfate, a barium titanate, a lithopone, an aluminum oxide, a calcium carbonate, a silicon oxide, an antimony trioxide, a titanium phosphate, a zinc oxide, a white lead, or a zirconium oxide; and an organic powder such as a polystyrene, styrene-divinylbenzene copolymer.

Among these pigments, it is preferable to use a titanium dioxide, an aluminum oxide or a barium titanate, and a titanium dioxide is particularly effective. The titanium dioxide may be a rutile type or an anatase type. An anatase type is preferable when prioritizing whiteness, and a rutile type is preferable when prioritizing the covering. In view of both whiteness and sharpness, a rutile type and an anatase type may be blended. These titanium dioxides may be produced by a sulfate method or a chloride method.

Specific examples of titanium dioxide include JR, JRNC, JR-301, 403, 405, 600A, 605, 600E, 603, 701, 800, 805, 806, JA-1, C,3,4,5, MT-01, 02, 03, 04, 05, 100AQ, 100SA, 100SAK, 100SAS, 100TV, 100Z, 100ZR, 150W, 500B, 500H, 500SA, 500SAK, 500SAS, 500T, SMT-100SAM, 100SAS, 500SAM, 500SAS (all of which are manufactured by TAYCA CORPORATION) CR-50, 50-2, 57, 58, 58-2, 60, 60-2, 63, 67, 80, 85, 90, 90-2, 93, 95, 97, 953, Super70, PC-3, PF-690, 691, 711, 736, 737, 739, 740, 742, R-550, 580, 630, 670, 680, 780, 780-2, 820, 830, 850, 855, 930, 980, S-305, UT771, TTO-51(A), 51(C), 55(A), 55(B), 55(C), 55(D), S-1, S-2, S-3, S-4, V-3, V-4, MPT-136, FTL-100, 110, 200, 300 (all of which are manufactured by ISHIHARA SANGYO KAISHA LTD.), KA-10, 15, 20, 30, KR-310, 380, KV-200, STT-30EHJ, 65C-S, 455, 485SA15, 495M, 495MC (all of which are manufactured by Titan Kogyo), TA-100, 200, 300, 400, 500, TR-600, 700, 750, 840, 900 (all of which are manufactured by Fuji Titium Industry Co., Ltd.), and these titanium dioxide may be used alone or in combination.

In order to improving dispersibility with regard to the resin, a titanium dioxide may be treated by known material such as a silane coupling agent having an amino group, a glycidyl group, an ureide group, an isocyanate group, a mercapto group, a vinyl group, an allyl group, an acryloxy group, a methacryloxy, a styryl group as a functional group.

A mass rate of a mixture of the resin and white pigment is preferably the range of from 90/10 to 30/70 (resin/white pigment), more preferably from 80/20 to 40/60, and furthermore preferably from 70/30 to 40/60.

The reflective layer 24 preferably contains a fluorescent whitening agent. Examples of the fluorescent whitening agent include a benzoxazole-based, a coumalin-based, a pyrazoline-based, or a styrenebiphenyl derivative, and preferably benzooxazolyl naphthalene-based, benzooxazolyl stilbene-based, or benzooxazolyl thiophene-based.

The content of the fluorescent whitening agent in the reflective layer 24 is from 0.1% to 10% by mass, preferably from 0.1% to 5% by mass, and more preferably from 0.1% to 3.0% by mass.

The reflective layer 24 may be formed by coating a resin solution dispersing a white pigment, additionally blending a fluorescent whitening agent. Examples of coating methods includes known methods such as a blade coater, an air doctor coater, a rod coater, a knife coater, a squeeze coater, a dip coater, a reverse roll coater, a transfer roll coater, a gravure coater, a kiss roll coater, a cast coater, a spray coater, a curtain coater, a extrusion coater. For details, *Coating engineering* written by YUJI HARASAKI may be refer to.

Examples of solvents for the resin solution include water, methanol, ethanol, isopropyl alcohol, acetone, methylethylketone, tetrahydrofuran, ethyl acetate, butyl acetate, hexane, toluene, acetonitrile, γ-butyllactone, N-methylpyrolidone, N-dimethyl acetoamide, or dimethylsulfoxide, and preferably butyl acetate, N-methylpyrolidone or N-dimethyl acetoamide, from the viewpoint of the low volatile and the high solubility for the resin.

Examples of dispersing methods of the resin solution include a vibration mill, a roll mill, a ball mill, a beads mill, a paint shaker or a homogenizer, preferably a roll mill, a ball mill or a beads mill from the viewpoint of the high dispersibility of the pigments.

After coating the resin solution by the above method, heating and drying are performed in order to eliminate the solvent. The temperature and time for heating is adjusted as necessary depending on the kind or the volume of the solvent used.

The resin solution may be directly coated on the substrate 10, or the resin solution may be coated on a film (for example, PET) and the coated film may be adhered to the substrate 10.

Alternatively, the reflective layer 24 may be produced by a fusion casting method with a colored resin which is made by kneading a thermoplastic resin, a white pigment and a fluorescent whitening agent with a roll mill or a kneader (extruder) while heating at above the glass transition temperature of the resin. When fusion casting, the reflective layer may be formed as a film on a base film. The reflective layer 24 may be produced by other methods without being limited to the above method.

Alternatively, a synthetic paper such as ULTRA YUPO, SUPER YUPO, NEW YUPO, ALFA YUPO (registered, all of which are manufactured by YUPO CORPORATION) may be used as a reflective layer.

In order to improving a reflectance, a metal foil, a film adhering a metal foil or a metal vapor deposition film may be adhered under the reflective layer containing a white pigment. Specific examples of metal for the reflective layer include known metal such as aluminum, silver, silver alloy, platinum, chromium, or stainless. These metal may be used as a single layer or an accumulated layer. From the viewpoint of high reflectance, it is preferable to use aluminum, silver or silver alloy.

A luminous reflectance (Y value) of the reflective layer 24 is preferably from 60% to 100% from the viewpoint of enhancing a reflectance of a display device, more preferably from 70% to 100%, and furthermore preferably from 80% to 90%. The luminous reflectance (Y value) is defined as a reflectance rate measured by integrating sphere measurement not including specular reflection using a spectrophotometer, when a standard white plate is calibrated at 100%.

A whiteness of the reflective layer 24, which is measured by ASTM E313, is preferably from 60 to 120, more preferably from 80 to 120, and furthermore preferably 90 to 120.

A luminous reflectance (Y value) of the reflective display device is preferably from 10% to 100% from the viewpoint of enhancing a contrast of a display device, more preferably from 20% to 100%, and furthermore preferably from 40% to 100%.

A whiteness of the reflective display device is preferably from 10 to 120, more preferably from 20 to 120, and furthermore preferably 30 to 120.

The reflective display device of the present embodiment has same components as the transmissive liquid crystal device, except for providing the reflective layer, and the other explanation will be abbreviated.

<Application>

Since in the liquid crystal device of the present invention, the colored and scattered state can be kept in a state that no voltage is applied, there are brought advantages that (1) the consumed electric power can be reduced so that a load is not applied to the environment; and (2) the deterioration of the liquid crystal device can be suppressed so that a long life can be realized. Accordingly, the liquid crystal device of the present invention is able to decrease the battery capacity and is applicable to main-display or sub-display of mobile appliances such as a digital camera, a wrist watch, a cell phone, a mobile telephone or an electronic music device.

Also, since the liquid crystal device of the present invention has high light modulation performance, it can be favorably used for light modulation, security, onboard use, interiors, advertisements and information indication panels.

The liquid crystal device may employ known driving methods such as a (1) segment driving using 7 segments and a dot-matrix, (2) passive matrix driving using a stripe electrode, and (3) active matrix driving using a TFT element or a TFD element. The gradation display method may use known modulation methods such as a pulse width modulation method or a frame modulation method, and may be combined with overdrive driving as appropriate.

The liquid crystal device may be used for the main-display or sub-display of an electronic inventory tag, an electronic musical instrument, a clock, an electronic book, an electronic dictionary or the like.

EXAMPLES

The present invention is hereunder described in more detail with reference to the following Examples. Materials, reagents, amounts and proportions thereof, operations and the like can be properly changed so far as they do not deviate from the spirit and scope of the present invention. Accordingly, it should not be construed that the present invention is limited to these Examples.

Example 1

ITO substrates (100Ω/□) prepared by coating and baking a vertical alignment film SE5300 (manufactured by Nissan Chemical Industries, Ltd.) were stuck at a gap of 15 μm to prepare a liquid crystal cell. Next, 93.5 parts by weight of CA-32150 (nematic liquid crystal, manufactured by Asahi Denka Kogyo K.K., $\Delta\epsilon$: 21.6, $\Delta n$: 0.136) as a liquid crystal was mixed with 5.0 parts by weight of cholesteryl nonanate (manufactured by Asahi Denka Kogyo K.K.) as a chiral reagent and 1.5 parts by weight of S-426 (manufactured by Mitsui Toatsu Chemicals, Inc.) as a dichroic dye, and the mixture was heated and dissolved to prepare a liquid crystal composition, which was then injected into the above-described liquid crystal cell. At that time, this liquid crystal composition had a pitch length of 3.9 μm.

Furthermore, a sealing agent for liquid crystal PHOTOLEC A-704 (manufactured by Sekisui Chemical Co., Ltd.) was added dropwise into an injection port and cured by irradiation with UV rays to prepare a liquid crystal cell for evaluation.

Example 2

A liquid crystal cell for evaluation was prepared in the same manner as in Example 1, except for using a liquid crystal composition prepared by mixing 96 parts by weight of CA-32150 as a liquid crystal with 2.5 parts by weight of cholesteryl nonanate as a chiral reagent and 1.5 parts by weight of S-426 (manufactured by Mitsui Toatsu Chemicals, Inc.) as a dichroic dye.

At that time, this liquid crystal composition had a pitch length of 7.6 μm.

Example 3

A liquid crystal cell for evaluation was prepared in the same manner as in Example 1, except for using a liquid crystal composition prepared by mixing 96.7 parts by weight of CA-32150 as a liquid crystal with 1.8 parts by weight of cholesteryl nonanate as a chiral reagent and 1.5 parts by weight of S-426 (manufactured by Mitsui Toatsu Chemicals, Inc.) as a dichroic dye.

At that time, this liquid crystal composition had a pitch length of 10.4 μm.

Comparative Example 1

A liquid crystal cell for evaluation was prepared in the same manner as in Example 1, except for using a liquid crystal composition prepared by mixing CA-32150 (97.5 parts by weight) as a liquid crystal with cholesteryl nonanate (1.0 part by weight) as a chiral reagent and S-426 (1.5 parts by weight) as a dichroic dye and heating and dissolving the mixture.

At that time, this liquid crystal composition had a pitch length of 18.6 μm.

(Measurement Method of Transmittance)

A transmittance of the liquid crystal cell was measured using a spectrophotometer, UV-2400 in a state that no voltage was applied (at the time of opening) and in a state that voltage (rectangular wave, 100 Hz, 10 V) was applied, respectively. A transmittance at a wavelength of 550 nm was employed as a representative value.

(Evaluation of Scattering Properties)

For the evaluation of scattering properties, a transmittance was measured immediately after opening the circuit after applying the voltage and after elapsing 8 hours immediately after opening, and a difference in transmittance at a wavelength of 800 nm was determined. When this difference was not more than 2.0, it was judged that the scattering properties were kept.

(Measurement Method of Threshold Voltage)

The applied voltage was increased by every 1 V (peak to peak), and a transmittance at a wavelength of 550 nm was measured at each voltage using a spectrophotometer, UV-2400. A voltage value at which the transmittance was saturated was defined as a threshold voltage.

The obtained results are shown in Table 1. In Table 1, P/C expresses a ratio of a chiral pitch length (P) of the liquid crystal composition to a gap (G) between the pair of electrodes.

TABLE 1

| | Pitch length (μm) | P/G | Alignment film (Type) | Transmittance at the time of opening (%) | Transmittance at the time of voltage application (%) | Scattering properties | Threshold voltage (V) |
|---|---|---|---|---|---|---|---|
| Example 1 | 3.9 | 0.21 | SE5300 (Vertical) | 16.9 | 63.7 | 0.40 | 7.0 |
| Example 2 | 7.6 | 0.51 | SE5300 (Vertical) | 24.7 | 63.2 | 0.2 | 7.0 |
| Example 3 | 10.4 | 0.69 | SE5300 (Vertical) | 29.1 | 64.2 | 0.6 | 7.0 |
| Comparative Example 1 | 18.6 | 1.33 | SE5300 (Vertical) | 63.2 | 63.2 | — (Not scattered) | — |

(Results)

In Examples 1 to 3 in which the ratio (P/G) of a chiral pitch length (P) of the liquid crystal composition with regard to a gap (G) between the pair of electrodes is less than 1.0, the scattered state was kept. In particular, when P/G was about 0.5, the scattered state was kept satisfactory.

On the other hand, in Comparative Example 1 in which P/G exceeds 1.0, since the chiral pitch length was longer than the cell gap, even in a state that no voltage was applied, the liquid crystal was vertically aligned and did not cause scattering. Also, the transmittance was constant regardless of the presence or absence of the application of voltage.

Example 4

A liquid crystal cell for evaluation was prepared in the same manner as in Example 1, except for using a liquid crystal composition prepared by mixing 88.8 parts by weight of CA-32150 and 4.7 parts by weight of NKV-3-162-5 (nematic liquid crystal, manufactured by Kanto Chemical Co., Inc.) which is a tetracyclic liquid crystal.

At that time, this liquid crystal composition had a pitch length of 3.9 μm.

Comparative Example 2

A liquid crystal cell for evaluation was prepared in the same manner as in Example 4, except for using ITO substrates prepared by coating and baking SE130 (manufactured by Nissan Chemical Industries, Ltd.) which is a horizontal alignment film.

Comparative Example 3

A liquid crystal cell for evaluation was prepared in the same manner as in Example 4, except for using untreated ITO substrates.

As to Example 4 and Comparative Examples 2 and 3, the transmittance, scattering properties and threshold voltage were measured in the above-described methods. The results are shown in Table 2.

TABLE 2

| | Pitch length (μm) | P/G | Alignment film (Type) | Transmittance at the time of opening (%) | Transmittance at the time of voltage application (%) | Scattering properties | Threshold voltage (V) |
|---|---|---|---|---|---|---|---|
| Example 4 | 3.9 | 0.21 | SE5300 (Vertical) | 16.4 | 63.0 | 0.18 | 7.5 |
| Comparative Example 2 | 3.9 | 0.21 | SE130 (Horizontal) | 13.6 | 55.6 | 6.2 | 9.0 |
| Comparative Example 3 | 3.9 | 0.21 | — (Not imparted) | 17.3 | 57.6 | 0.02 | 9.0 |

(Results)

In the liquid crystal device of Example 4 containing a nematic liquid crystal which is a tetracyclic liquid crystal, the scattering properties were further enhanced.

On the other hand, in Comparative Example 2 which is concerned with a liquid crystal device using the same liquid crystal composition as in Example 4 but using a horizontal alignment film as the alignment film, the scattering properties were remarkably reduced, and the threshold voltage increased.

Furthermore, in Comparative Example 3 using the same liquid crystal composition as in Example 4 but not provided with an alignment film, the transmittance at the time of voltage application was lower than that in Example 4, and the threshold voltage was high. In Comparative Example 3, though the scattering properties are good, in view of the matter that scattering properties of not more than 2.0 are considered to be sufficient, the scattering properties of a degree as in Comparative Example 3 are not required.

Example 5

2 parts by weight of dodecyltrimethoxysilane (manufactured by AZmax Co., Ltd.), 5 parts by weight of pure water and 93 parts by weight of isopropyl alcohol were mixed, and the mixture was then gently stirred at room temperature for 2 hours to obtain a mixed solution. The mixed solution was coated on ITO electrodes and then dried on a hot plate at 100° C. for one hour.

Next, the ITO electrodes were subjected to ultrasonic rinsing (10 minutes) with a 3% by mass detergent aqueous solution, pure water and ethanol in this order, to prepare dodecylsilane-modified ITO substrates, which were then stuck at a gap of 15 μm. There was thus prepared a liquid crystal cell.

The same liquid crystal composition as in Example 3 was injected into the gap to prepare a liquid crystal cell for evaluation.

Example 6

A liquid crystal cell for evaluation was prepared in the same manner as in Example 1, except for using a liquid crystal composition prepared by mixing 96 parts by weight of HA-11757 (nematic liquid crystal, manufactured by Asahi Denka Kogyo K.K., Δ∈: 21.5, Δn: 0.200) as a liquid crystal, 2.0 parts by weight of CNL-617L (manufactured by Asahi Denka Kogyo K.K.) as a chiral reagent and 2.0 parts by weight of the following anthraquinone based dye as a dichroic dye.

At that time, this liquid crystal composition had a pitch length of 4.5 μm.

by weight of cyanomethylated cellulose CR-S (manufactured by Shin-Etsu Chemical Co., Ltd.) were dissolved into 300 parts by weight of N-methylpyrolidone to prepare a polymer solution. 30 parts by weight of titanium dioxide JR-405 (manufactured by TAYCA CORPORATION) were dispersed in 100 parts by weight of the polymer solution to prepare a white polymer solution. The white polymer solution was coated on PET film, and heated and dried for 30 minutes on a hot plate at 100° C. to produce a white reflective plate.

(Measurement of the Reflectance and Whiteness of the White Reflective Plate)

The luminous reflectance (Y value), and ASTM E313 as the whiteness of the white reflective plate, were measured in conditions in which AL/PET30-188 (manufactured by Matsushita Electric Industrial Co., Ltd) was provided as a lowermost layer, using a C light source and a field of view of 2°, with a chroma color meter CR-400 (manufactured by KONICA MINOLTA HOLDINGS, INC.).

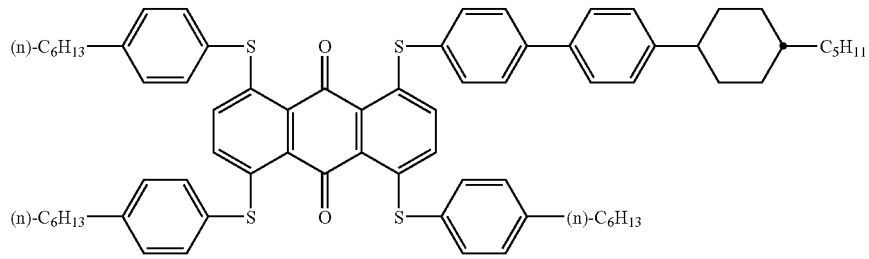

As to Examples 5 and 6, the transmittance, scattering properties and threshold voltage were measured in the above-described methods. The results are shown in Table 3.

The luminous reflectance of the white reflective plate was 89.0% and the whiteness of the white reflective plate was 85.0.

TABLE 3

| | Pitch length (μm) | P/G | Alignment film (Type) | Transmittance at the time of opening (%) | Transmittance at the time of voltage application (%) | Scattering properties | Threshold voltage (V) |
|---|---|---|---|---|---|---|---|
| Example 5 | 10.4 | 0.69 | Dodecyltrimethoxysilane (Vertical) | 20.8 | 55.6 | 2.0 | 7.0 |
| Example 6 | 4.5 | 0.3 | SE5300 (Vertical) | 23.0 | 64.2 | 0.90 | 11.0 |

(Results)

Example 5 is concerned with a liquid crystal device in which the type of the vertical alignment film is changed to dodecyltrimethoxysilane. Even in this case, switching between the colored and scattered state and the transparent state can be achieved, and the threshold voltage can be reduced.

Also, Example 6 is concerned with a liquid crystal device in which the types of the liquid crystal, dichroic dye and chiral reagent are changed. Even in this case, the transmittance at the time of voltage application is high, and the scattering can be kept.

Example 7

Producing for White Reflective Plate 58.8 parts by weight of polymethylmethacrylate (manufactured by Wako Pure Chemical Industries, Ltd.) and 1.2 parts (Producing of Liquid Crystal Cell for Evaluation)

ITO substrates (100Ω/□) prepared by coating and baking a vertical alignment film SE5300 (manufactured by Nissan Chemical Industries, Ltd.) were stuck at a gap of 8 μm to prepare a liquid crystal cell. Next, 94.0 parts by weight of MLC-6828 (nematic liquid crystal, manufactured by Merck, Δn: 0.142) as a liquid crystal was mixed with 4.5 parts by weight of cholesteryl nonanate (manufactured by Asahi Denka Kogyo K.K.) as a chiral reagent and 1.5 parts by weight of S-426 (manufactured by Mitsui Toatsu Chemicals, Inc.) as a dichroic dye, and the mixture was heated and dissolved to prepare a liquid crystal composition, which was then injected into the above-described liquid crystal cell. At that time, this liquid crystal composition had a pitch length of 3.6 μm.

Furthermore, a sealing agent for liquid crystal PHOTOLEC A-704 (manufactured by Sekisui Chemical Co., Ltd.) was added dropwise into an injection port and cured by irradiation with UV rays to prepare a liquid crystal cell. The obtained white reflective plate was adhered to a lower surface of the liquid crystal cell by double-sided acrylic film to produce a liquid crystal cell for evaluation.

(Measurement of the Reflectance and Whiteness of the Liquid Crystal Cell for Evaluation)

A reflectance of the liquid crystal cell for evaluation was respectively measured in a state that no voltage was applied (at the time of opening) and in a state that voltage (rectangular wave, 100 Hz, 10 V) was applied, in the same manner as in the above measurement method of the reflectance of the white reflective plate.

A whiteness of the liquid crystal cell for evaluation was measured in a state that voltage (rectangular wave, 100 Hz, 10 V) was applied, in the same manner as in the above measurement method of the whiteness of the white reflective plate.

(Measurement Method of Threshold Voltage)

The applied voltage was increased by every 1 V (peak to peak), and a luminous reflectance (Y value) was measured at each voltage using chroma color meter, CR-400. A voltage value at which the reflectance was saturated was defined as a threshold voltage.

The obtained results are shown in Table 4. In Table 4, P/G expresses a ratio of a chiral pitch length (P) of the liquid crystal composition to a gap (G) between the pair of electrodes.

Example 8

Producing for White Reflective Plate Containing a Fluorescent Whitening Agent 60 parts by weight of polymethylmethacrylate (manufactured by Wako Pure Chemical Industries, Ltd.) was dissolved into 300 parts by weight of N-methylpyrolidone to prepare a polymer solution. 20 parts by weight of titanium dioxide JR-405 (manufactured by TAYCA CORPORATION) and 0.15 parts by weight of fluorescent whitening agent UVITEX OB (manufactured by Ciba Japan K.K.) were added and dispersed into 100 parts by weight of the polymer solution to prepare a white polymer solution.

The white polymer solution was coated on PET film with a blade coater (clearance: 200 μm), heated and dried for 30 minutes on a hot plate at 100° C., and then accumulation coated with a blade coater and dried to produce a white reflective plate containing a fluorescent whitening agent.

The reflectance of the white reflective plate containing the fluorescent whitening agent was 89.7% and the whiteness was 90.3.

(Producing of Liquid Crystal Cell for Evaluation)

A liquid crystal cell for evaluation was prepared in the same manner as in Example 7, except for changing the white reflective plate of Example 7 to the above white reflective plate containing a fluorescent whitening agent.

(Evaluation of the Liquid Crystal Cell for Evaluation)

The liquid crystal cell for evaluation of Example 8 was measured in the same manner as in Example 7, as to a reflectance, a whiteness and a threshold voltage. The results are shown in Table 4.

Comparative Example 4

A liquid crystal cell for evaluation was prepared in the same manner as in Example 7, except for changing the vertical alignment film SE5300 (manufactured by Nissan Chemical Industries, Ltd.) to a horizontal alignment film SE130 (manufactured by Nissan Chemical Industries, Ltd.). The liquid crystal cell for evaluation was evaluated in the same manner as in Example 7. The results are shown in Table 4.

Example 9

Producing for White Reflective Plate

A white reflective plate was produced in the same manner as in Example 7.

(Producing of Liquid Crystal Cell for Evaluation)

A liquid crystal cell for evaluation was prepared in the same manner as in Example 7, except for using a liquid crystal composition prepared by changing 2.5 parts by weight of the following anthraquinone based dye as a dichroic dye.

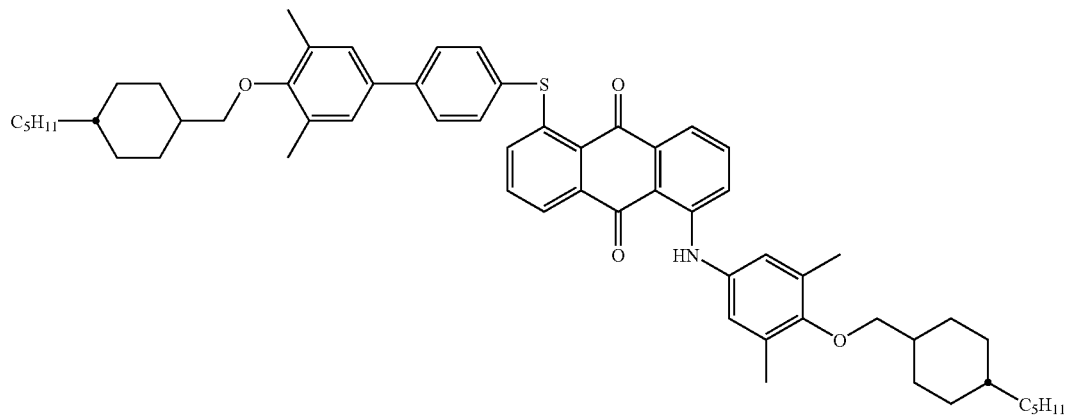

(Measurement Method of Whiteness)

A whiteness of the liquid crystal cell for evaluation was measured in a state that voltage (rectangular wave, 100 Hz, 10 V) was applied, in the same manner as in the above measurement method of the whiteness of the white reflective plate.

(Measurement Method of Threshold Voltage)

The applied voltage was increased by every 1 V (peak to peak), and a chroma (C*) was measured at each voltage using chroma color meter, CR-400. L*a*b* was measured according to JIS Z 8729. A voltage value at which the chroma (C*) was reached to a lower limit was defined as a threshold voltage.

Example 10

A liquid crystal cell for evaluation 10 was prepared in the same manner as in Example 9, except for using a liquid crystal composition prepared by changing 2.5 parts by weight of the following anthraquinone based dye as a dichroic dye.

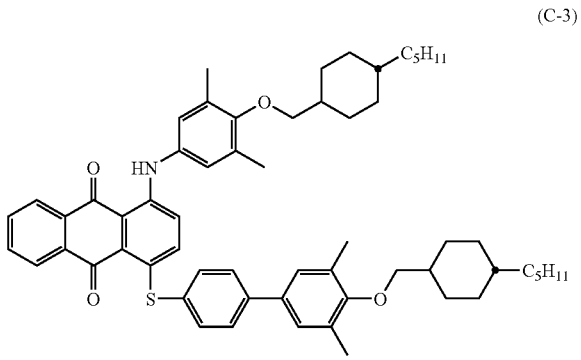
(C-3)

(Evaluation of the Liquid Crystal Cell for Evaluation)

The liquid crystal cell for evaluation of Example 10 was measured in the same manner as in Example 9, as to a whiteness and a threshold voltage. The results are shown in Table 5.

Comparative Example 5

A liquid crystal cell for evaluation was prepared in the same manner as in Example 9, except for changing the vertical alignment film SE5300 (manufactured by Nissan Chemical Industries, Ltd.) to a horizontal alignment film SE130 (manufactured by Nissan Chemical Industries, Ltd.). The liquid crystal cell for evaluation was evaluated in the same manner as in Example 9. The results are shown in Table 5.

Comparative Example 6

A liquid crystal cell for evaluation was prepared in the same manner as in Example 10, except for changing the vertical alignment film SE5300 (manufactured by Nissan Chemical Industries, Ltd.) to a horizontal alignment film SE130 (manufactured by Nissan Chemical Industries, Ltd.). The liquid crystal cell for evaluation was evaluated in the same manner as in Example 9. The results are shown in Table 5.

Example 11

Figure 8:
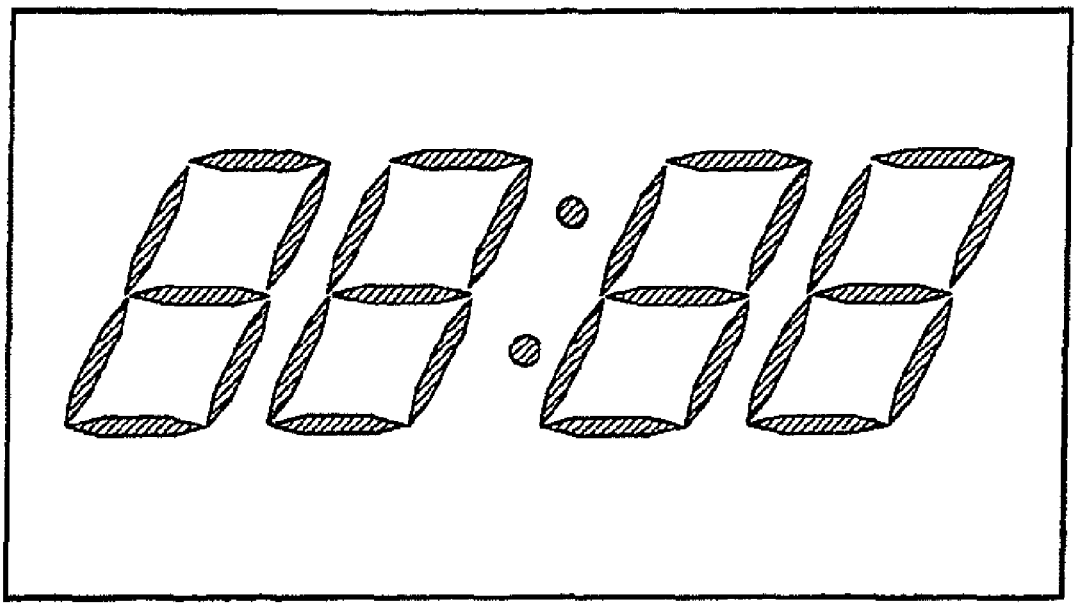
FIG. 8 is a schematic view showing an embodiment of a clock face (4 digit) of digital display produced in Example 11.

As shown in FIG. 8, a vertical alignment film SE5300 (manufactured by Nissan Chemical Industries, Ltd.) was coated and baked on a pair of ITO electrode substrates (30Ω/☐) patterned with 7 segments of 4 digits, which were then adhered with a gap of 8 μm therebetween to form a liquid crystal cell. The liquid crystal composition of Example 9 was injected into the above-described liquid crystal cell, and then a sealing agent for liquid crystal PHOTOLEC A-704 (manufactured by Sekisui Chemical Co., Ltd.) was added dropwise into an injection port and cured by irradiation with UV rays to prepare a liquid crystal cell for clock display. The white reflective plate containing the fluorescent whitening agent prepared in Example 8 was adhered to a lower surface of the liquid crystal cell with double-sided acrylic film to produce a digital clock face having two color tones of red and white. The digital clock face exhibited excellent visibility when voltage driven.

TABLE 4

| | Pitch length (μm) | P/G | Alignment film (Type) | At the time of opening Reflectance (%) | At the time of voltage application | | Threshold voltage (V) | Remarks |
| --- | --- | --- | --- | --- | --- | --- | --- | --- |
| | | | | | Reflectance (%) | Whiteness degree | | |
| Example 7 | 3.6 | 0.45 | SE5300 (Vertical) | 15.8 | 43.8 | 29.2 | 8 | |
| Example 8 | 3.6 | 0.45 | SE5300 (Vertical) | 13.9 | 44.6 | 31.8 | 8 | White reflective plate containing a fluorescent whitening agent |
| Comparative Example 4 | 3.6 | 0.45 | SE130 (Horizontal) | 9.2 | 40.6 | 25.8 | 17 | |

TABLE 5

| | Pitch length (μm) | P/G | Alignment film (Type) | Whiteness degree | Threshold voltage (V) |
| --- | --- | --- | --- | --- | --- |
| Example 9 | 3.6 | 0.45 | SE5300 (Vertical) | 63.5 | 5 |
| Example 10 | 3.6 | 0.45 | SE5300 (Vertical) | 96.3 | 6 |
| Comparative Example 5 | 3.6 | 0.45 | SE130 (Horizontal) | 61.2 | 15 |
| Comparative Example 6 | 3.6 | 0.45 | SE130 (Horizontal) | 98.1 | 15 |

(Results)

In the reflective liquid crystal devices of Examples 7 and 8, reflectance at the time of voltage application was greatly enhanced compared to Comparative Example 4 provided with a horizontal alignment film, and whiteness at the time of voltage application was also greatly enhanced compared to Comparative Example 4. The threshold voltages of Examples 7 and 8 were remarkably low compared to Comparative Example 4, whereby it was found that the reflective liquid crystal devices of Examples 7 and 8 may reduce power consumption.

The whiteness of Example 9 was higher than that of Comparative Example 5 and, the whiteness of Example i 0 was equal to that of Comparative Example 6. The threshold voltages of Examples 9 and 10 were remarkably reduced compared to those of Comparative Examples 5 and 6. Therefore, it was found that the reflective liquid crystal devices of Examples 9 and 10 may reduce power consumption, in addition to exhibiting excellent whiteness.

The foregoing description of the embodiments of the present invention has been provided for the purposes of illustration and description. It is not intended to be exhaustive or to limit the present invention to the precise forms disclosed. Obviously, many modifications and variations will be apparent to practitioners skilled in the art. The embodiments were chosen and described in order to best explain the principles of the present invention and its practical applications, thereby enabling others skilled in the art to understand the present invention for various embodiments and with the various modifications as are suited to the particular use contemplated. It is intended that the scope of the present invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A liquid crystal device comprising:
   a pair of electrodes provided with a vertical alignment film; and
   a liquid crystal layer disposed between the pair of electrodes and including a liquid crystal composition containing a liquid crystal with positive dielectric anisotropy, a dichroic dye and a chiral reagent;
   wherein a ratio (P/G) of a chiral pitch length (P) of the liquid crystal composition to a gap (G) between the pair of electrodes is from 0.06 to less than 1.0.

2. The liquid crystal device according to claim 1, wherein the ratio (P/G) of the chiral pitch length (P) of the liquid crystal composition to the gap (G) between the pair of electrodes is from 0.1 to 0.7.

3. The liquid crystal device according to claim 1, wherein the chiral pitch length (P) of the liquid crystal composition is from 1 μm to 5 μm.

4. The liquid crystal device according to claim 1, wherein the liquid crystal with positive dielectric anisotropy comprises a liquid crystalline compound having four rings.

5. The liquid crystal device according to claim 1, wherein the liquid crystal with positive dielectric anisotropy comprises a cyano group-containing liquid crystal compound and a liquid crystalline compound having four rings.

6. The liquid crystal device according to claim 1, wherein the vertical alignment film is composed of a polyimide, a polyamic acid or a mixture thereof.

7. The liquid crystal device according to claim 1, comprising two or more dichroic dyes which absorb light having a wavelength of 400 nm to 680 nm.

8. The liquid crystal device according to claim 1, wherein:
   the pair of electrodes are transparent electrodes; and
   an ultraviolet absorbing layer is provided on a non-conductive surface of a substrate of at least one of the pair of electrodes.

9. The liquid crystal device according to claim 1, wherein a reflective layer is provided on a substrate of at least one of the pair of electrodes.

10. The liquid crystal device according to claim 9, wherein the reflective layer comprises a white pigment and a fluorescent whitening agent.

* * * * *